United States Patent
Ueda et al.

(10) Patent No.: US 7,866,208 B1
(45) Date of Patent: Jan. 11, 2011

(54) FLOW MEASURING DEVICE

(75) Inventors: Naotsugu Ueda, Kusatsu (JP);
Katsuyuki Yamamoto, Kusatsu (JP);
Shuji Maeda, Otsu (JP); Yuji Tsuji,
Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 12/712,898

(22) Filed: Feb. 25, 2010

(30) Foreign Application Priority Data

Jul. 1, 2009 (JP) .............................. 2009-157205

(51) Int. Cl.
*G01F 1/68* (2006.01)
(52) U.S. Cl. .................................................. 73/204.15
(58) Field of Classification Search .............. 73/204.15, 73/202.5, 202
See application file for complete search history.

(56) References Cited

U.S. PATENT DOCUMENTS

| | | | | |
|---|---|---|---|---|
| 4,648,270 | A * | 3/1987 | Johnson et al. | 73/202.5 |
| 5,571,964 | A * | 11/1996 | Sawada et al. | 73/202 |
| 6,446,504 | B1 * | 9/2002 | Maginnis, Jr. | 73/204.27 |
| 6,886,401 | B2 * | 5/2005 | Ito et al. | 73/202 |
| 6,928,865 | B2 * | 8/2005 | Ito et al. | 73/204.21 |
| 7,305,877 | B2 * | 12/2007 | Beyrich et al. | 73/202.5 |
| 7,574,908 | B2 * | 8/2009 | Ueda et al. | 73/202 |
| 2009/0078039 | A1 | 3/2009 | Ueda et al. | |

FOREIGN PATENT DOCUMENTS

| | | | |
|---|---|---|---|
| JP | 2004-355045 | A | 12/2004 |
| JP | 3870969 | B2 | 10/2006 |

* cited by examiner

*Primary Examiner*—Jewel Thompson
(74) *Attorney, Agent, or Firm*—Osha Liang LLP

(57) ABSTRACT

A flow measuring device has a flow channel block including a main flow channel whose both ends are open, and an auxiliary flow channel that branches from the main flow channel, a flow amount measurement element provided for the auxiliary flow channel, and a branch entrance and a collection exit that open in a wall surface of the main flow channel, and that communicate to the auxiliary flow channel, so that a part of a gaseous body that flows through the main flow channel is directed to the auxiliary flow channel through the branch entrance, and the gaseous body that has passed through the auxiliary flow channel is directed back to the main flow channel through the collection exit. A holding member containing portion is provided in a depressed manner for an area excluding an area including the branch entrance and an area including the collection exit in a circumference surface of a space of the flow channel block that configures the main flow channel. An orifice is contained within the main flow channel. An orifice holding member fitted into the holding member containing portion holds the orifice by being brought into contact with the orifice. The wall surface of the main flow channel is configured by a wall surface excluding the area for which the holding member containing portion is formed out of the main flow channel and an inner surface of the orifice holding member.

10 Claims, 30 Drawing Sheets

FIG. 7

| | SAMPLE | SET FLOW AMOUNT (L/min) | POSITIONAL DISPLACEMENT OF VENT HOLE | | MAIN FLOW CHANNEL | | | ORIFICE | | |
|---|---|---|---|---|---|---|---|---|---|---|
| | | | DISTANCE (mm) | ANGLE (deg.) | CROSS-SECTIONAL AREA (m²) | AVERAGE FLOW VELOCITY (m/s) | FLOW AMOUNT (L/min) | CROSS-SECTIONAL AREA (m²) | AVERAGE FLOW VELOCITY (m/s) | FLOW AMOUNT (L/min) |
| STANDARD MODEL 1 | No.1 | 500 | 0 | 0 | 0.00031 | 28.86 | 520.3 | 0.00018 | 49.12 | 520.3 |
| | No.2 | 500 | −0.25 | 0 | 0.00031 | 28.85 | 520.2 | 0.00018 | 49.12 | 520.2 |
| | No.3 | 500 | 0 | −1.2 | 0.00031 | 28.86 | 520.5 | 0.00018 | 49.14 | 520.5 |
| STANDARD MODEL 2 | No.4 | 300 | 0 | 0 | 0.00031 | 17.30 | 312.9 | 0.00018 | 29.54 | 312.9 |
| | No.5 | 300 | −0.25 | 0 | 0.00031 | 17.29 | 312.1 | 0.00018 | 29.47 | 312.1 |
| | No.6 | 300 | 0 | −1.2 | 0.00031 | 17.30 | 312.2 | 0.00018 | 29.47 | 312.2 |

| | SAMPLE | AUXILIARY FLOW CHANNEL | | | CHANGING RATE OF FLOW RATIO (%) |
|---|---|---|---|---|---|
| | | CROSS-SECTIONAL AREA (m²) | AVERAGE FLOW VELOCITY (m/s) | FLOW AMOUNT (L/min) | |
| STANDARD MODEL 1 | No.1 | $5.00 \times 10^{-5}$ | 7.91 | 23.7 | 0.00 |
| | No.2 | $5.00 \times 10^{-5}$ | 6.74 | 20.2 | −14.28 |
| | No.3 | $5.00 \times 10^{-5}$ | 6.46 | 19.4 | −17.76 |
| STANDARD MODEL 2 | No.4 | $5.00 \times 10^{-5}$ | 4.36 | 13.1 | 0.00 |
| | No.5 | $5.00 \times 10^{-5}$ | 4.10 | 12.3 | −5.52 |
| | No.6 | $5.00 \times 10^{-5}$ | 3.93 | 11.8 | −9.27 |

FLOW MEASURING DEVICE

BACKGROUND OF THE INVENTION

1. Technical Field

The present invention relates to flow measuring devices, in particular, to a flow measuring device for measuring a flow amount of a gaseous body.

2. Related Art

A straight-tube type flow measuring device typically measures a flow velocity V of a gaseous body that flows through a flow channel 12 using a flow detection element 11, as shown in FIG. 1A or 1B, and measures a flow amount of the gaseous body within the flow channel 12 based on the measured flow velocity V and a flow channel cross-sectional area.

When a certain amount of the gaseous body flows through the flow channel 12 in the flow measuring device having such a structure, the flow velocity V of the gaseous body increases if the flow channel cross-sectional area is small as shown in FIG. 1A, and the flow velocity V of the gaseous body decreases if the flow channel cross-sectional area is large as shown in FIG. 1B. On the other hand, the flow detection element 11 has a predetermined measurable range, and if the flow velocity V of the gaseous body falls outside the measurable range, measurement accuracy for the flow velocity V decreases or the flow velocity V becomes unmeasurable. Therefore, for a straight-tube type flow measuring device that directly measures a large flow amount of the gaseous body, for example, 200 liters/min (hereinafter abbreviating liters/min to L/min), it is necessary to increase a diameter of the flow channel 12 in order to reduce the flow velocity V so as to fall within the measurable range of the flow detection element 11, which restricts downsizing of the device.

Therefore, in order to downsize a flow measuring device for measuring a large flow amount, a flow measuring device of a bypass flow channel structure as shown in FIG. 2 has been proposed. In the flow measuring device of the bypass flow channel structure, an auxiliary flow channel 14 is branched from a main flow channel 13, and an orifice 25 is provided within the main flow channel 13. Due to a differential pressure produced in the vicinity of the orifice 25, a part of the gaseous body that flows through the main flow channel 13 is directed to the auxiliary flow channel 14, and a flow velocity Vp of the gaseous body that flows through the auxiliary flow channel 14 is measured by the flow detection element 11. Then, a total flow amount is derived based on such as a flow ratio between the gaseous bodies that flow through the main flow channel 13 and the auxiliary flow channel 14, the flow velocity Vp in the auxiliary flow channel 14, and a flow channel cross-sectional area of the auxiliary flow channel 14.

Japanese Patent No. 3870969

As an example of the flow measuring device of the bypass flow channel structure, a device disclosed in Japanese Patent No. 3870969 is known. As shown in FIG. 3, in a flow measuring device 21 of this example, the main flow channel 13 is formed within a main flow tube 22 and the auxiliary flow channel 14 is formed outside the main flow tube 22, an inlet 23 and an outlet 24 that open inside the main flow channel 13 respectively communicate to both ends of the auxiliary flow channel 14. Further, the orifice 25 is provided within the main flow channel 13 between the inlet 23 and the outlet 24, and a flow ratio between the main flow channel 13 and the auxiliary flow channel 14 is adjusted according to an opening size and a shape of the orifice 25.

However, according to the flow measuring device 21, in order to reduce a number of component parts and a production tolerance of the flow ratio, the orifice 25 is integrally formed with the main flow tube 22. Accordingly, it is not possible to change the opening size and the shape of the orifice 25, the main flow tube 22 as a whole has to be redesigned and remanufactured when trying to change the opening size and such of the orifice 25. As a result, preparing flow measuring devices of flow amount ranges for various purposes becomes expensive and requires a large storage space.

On the other hand, it is possible to form the orifice 25 separately from the main flow tube 22, as shown in FIG. 4, in order to make the orifice 25 replaceable to commoditize the main flow tube 22. In this case, as shown in FIG. 4, it is possible to make the orifice 25 to be contained within the main flow channel 13, and makes a whole circumference of the orifice 25 adhered to a wall surface of the main flow channel 13 with an adhesive agent 26.

However, according to this method, a number of the steps of assembling the flow measuring device increases due to a step of applying the adhesive agent 26 and a thermal curing process of the adhesive agent. Further, the method of making the orifice 25 applied with the adhesive agent 26 to be contained within the main flow channel 13 may decrease the measurement accuracy because the adhesive agent 26 adheres to the wall surface of the main flow channel 13 (in particular, in the vicinity of the inlet 23). Furthermore, even with the method of applying the adhesive agent 26 to the wall surface of the main flow channel 13 in advance and then making the orifice 25 to be contained afterwards, the adhesive agent 26 can protrude from a portion between the orifice 25 and the wall surface of the main flow channel 13, thereby causing the decrease of the measurement accuracy, and requiring the management of the adhesive agent.

Japanese Unexamined Patent Publication No. 2004-355045

The device disclosed in Japanese Unexamined Patent Publication No. 2004-355045 is one example of the flow measuring device of the bypass flow channel structure in which the orifice is formed separately from the main flow tube and the orifice is fixed within the main flow channel without using the adhesive agent. According to a flow measuring device 31 disclosed in Japanese Unexamined Patent Publication No. 2004-355045, as shown in FIG. 5, the orifice 25 and a collar 32 having a cylindrical shape are contained in the main flow channel 13, and the orifice 25 is sandwiched and held between a stopper section 34 formed within the main flow channel 13 and the collar 32. An end surface of the collar 32 and the stopper section 34 are respectively provided with fitting holes 35 and 37, and a supporting pin 38 press-fitted into the fitting hole 35 of the collar 32 is inserted through a through hole 36 of the orifice 25 and through the fitting hole 37 of the stopper section 34. With this, the collar 32 is baffled and a vent hole 33 opening in the collar 32 is positioned so as to be aligned with the inlet 23. Moreover, gas flow straighteners 39 and auxiliary spacers 40 are alternately contained at a rear of the collar 32.

Further, according to the structure as described in Japanese Unexamined Patent Publication No. 2004-355045, it is required to insert the supporting pin 38 into the fitting hole 37 of the stopper section 34 deep within the main flow channel 13, and the insertion is not easily carried out. Accordingly, as shown in FIG. 6B, a method of baffling the collar 32 by providing a projection 42 protruding around an outer circumference of a back end portion of the collar 32, and fitting the projection 42 into a depression 41 provided for the wall surface of the main flow channel 13 as shown in FIG. 6A can also be conceived.

SUMMARY

However, the structure disclosed in Japanese Unexamined Patent Publication No. 2004-355045 as shown in FIG. 5, and the structure as shown in FIGS. 6A and 6B can cause positional displacement between the vent hole 33 of the collar 32 and the inlet 23 due to production tolerance of component parts. For example, with the structure as shown in FIG. 5, the positions of the vent hole 33 and the inlet 23 are displaced due to such as variation of a position of the vent hole 33 of the collar 32, variation of a position of the fitting hole 35, and variation of a position of the fitting hole 37 of the stopper section 34. Also with the structure as shown in FIG. 6, the positions of the vent hole 33 and the inlet 23 are displaced due to the variation of the position of the vent hole 33 of the collar 32, variation of a position of the projection 42, and variation of a position of the depression 41 of the main flow channel 13.

The displacement of the positions of the vent hole 33 and the inlet 23 in this manner gives an influence on the flow of the gaseous body that flows from the main flow channel 13 into the auxiliary flow channel 14, and thus can produce variation in the flow ratio between the main flow channel 13 and the auxiliary flow channel 14, thereby causing the decrease of the measurement accuracy of the flow measuring device.

In order to identify a phenomenon in which the variation in the flow ratio occurs when the displacement of the position of the collar 32 occurs, the present inventors carried out the following experiment. First, two types of flow measuring devices (standard models 1 and 2) were prepared for the experiment. These flow measuring devices were such that a flow channel cross-sectional area of the main flow channel 13 was 0.00031 m$^2$, a cross-sectional area (opening area) of the orifice 25 was 0.00018 m$^2$, a flow channel cross-sectional area of the auxiliary flow channel 14 was 5.00×10$^{-5}$, and the vent hole 33 whose diameter was 5 mm opened in the collar 32 whose outer diameter was 24 mm and inner diameter was 22 mm. The standard model 1 was a type whose flow amount was large (set flow amount 500 L/min), and the standard model 2 was a type whose flow amount was small (set flow amount 300 L/min).

Using these flow measuring devices, a changing rate of the flow ratio when the vent hole 33 and the inlet 23 were displaced in an axial direction or a circumferential direction of the collar 32 from a position at which the vent hole 33 and the inlet 23 were aligned, and average flow velocity and flow amount in the main flow channel 13, the auxiliary flow channel 14, and the orifice 25 were measured. The results of the experiment are shown in FIG. 7.

Samples No. 1 and No. 4 in FIG. 7 were adjusted such that the vent hole 33 was aligned with the inlet 23 either in a length direction or in a circumferential direction of the collar 32, as shown in FIGS. 8A and 8B, using the standard models 1 and 2, respectively. Samples No. 2 and No. 5 were adjusted such that the vent hole 33 was displaced by 0.25 mm (5% of the diameter of the vent hole 33) from the inlet 23 in the axial direction of the collar 32, as shown in FIG. 9A, using the standard models 1 and 2, respectively. Samples No. 3 and No. 6 were adjusted such that the vent hole 33 was displaced in the circumferential direction of the vent hole 33 by 1.2 degrees from the position at which the vent hole 33 and the inlet 23 were aligned as shown in FIG. 9B, using the standard models 1 and 2, respectively.

Further, the changing rate of each of the flow ratio of the samples No. 1-6 is expressed by the following formula, where the flow ratio without positional displacement of the vent hole 33 is expressed by the flow amount of the main flow channel: the flow amount of the auxiliary flow channel=A:B, and the flow ratio with the positional displacement of the vent hole 33 is expressed by the flow amount of the main flow channel:the flow amount of the auxiliary flow channel=a:b. Note that the flow amount of the main flow channel does not include the flow amount of the gaseous body that flows through the auxiliary flow channel.

$$\text{changing rate of flow ratio} = \frac{\frac{b}{a+b} - \frac{B}{A+B}}{\frac{B}{A+B}} \quad \text{Formula 1}$$

According to FIG. 7, in the standard models 1 and 2, when the vent hole 33 is displaced in the axial direction of the collar 32 by 5% of the diameter of the vent hole 33, the changing rate of the flow ratio changes by around 6 to 15%. Further, it can be seen that, when the vent hole 33 is displaced in the circumferential direction of the collar 32 by 1.2 degrees, the changing rate of the flow ratio changes by around 10 to 18%. In addition, it can be seen that the change of the flow ratio becomes more prominent for the flow measuring device for a larger flow amount.

Therefore, in order to improve the measurement accuracy of the flow measuring device (in particular, the flow measuring device for a large flow amount), it is desired to eliminate the positional displacement between the vent hole of the collar and the inlet and to reduce the variation in the flow ratio. It should be noted that a method of increasing the diameter of the vent hole 33 greater than the diameter of the inlet 23 can be conceived in order to prevent the inlet 23 from being partially blocked by an edge of the vent hole 33 as shown in FIGS. 9A and 9B. However, even with this method, a stepped section was generated between the vent hole 33 and the inlet 23, and the flow of the gaseous body directed to the auxiliary flow channel 14 was disturbed by this stepped section, and thus it was not possible to reduce the variation of the flow ratio.

One or more embodiments of the present invention provides a flow measuring device of a bypass flow channel structure that holds an orifice using a member for holding the orifice (orifice holding member) with reduced variation of a flow ratio due to production tolerance and positional displacement of the orifice holding member.

In accordance with one aspect of the present invention, there is provided a flow measuring device, including: a flow channel block including a main flow channel whose both ends are open and an auxiliary flow channel that branches from the main flow channel; a flow amount measurement element provided for the auxiliary flow channel; and a branch entrance and a collection exit, each opening in a wall surface of the main flow channel, and each communicating to the auxiliary flow channel, so that a part of a gaseous body that flows through the main flow channel is directed to the auxiliary flow channel through the branch entrance, and the gaseous body that has passed through the auxiliary flow channel is directed back to the main flow channel through the collection exit, wherein a holding member containing portion is provided in a depressed manner for an area excluding an area including the branch entrance and an area including the collection exit in a circumference surface of a space of the flow channel block that configures the main flow channel, an orifice is contained within the main flow channel, an orifice holding member fitted into the holding member containing portion holds the orifice by being brought into contact with the orifice, and the wall surface of the main flow channel is configured by a wall surface excluding the area for which the holding member containing portion is formed out of the main flow channel and an inner surface of the orifice holding member.

According to the flow measuring device according to one or more embodiments of the present invention, as the orifice holding member for holding the orifice is fitted in the holding member containing portion provided in the depressed manner for the area excluding the area including the branch entrance and the collection exit in the circumference surface of the space that configures the main flow channel, the orifice holding member may not be overlapped with the branch entrance or the collection exit even if there is a variation (error) in the orifice holding member and the holding member containing portion. Further, the orifice holding member may not interfere the branch entrance or the collection exit by rotating within the main flow channel. Therefore, a variation in the flow ratio due to the variation of the component part can be reduced in the flow measuring device of a bypass flow channel structure in which the orifice is made replaceable and separately from the flow channel block. Further, as it is possible to form the wall surface of the main flow channel substantially smooth by the inner surface of the orifice holding member fitted into the holding member containing portion and the wall surface excluding the area where the holding member containing portion is formed out of the main flow channel, it is also possible to make the flow of the gaseous body through the main flow channel smooth. As a result, according to one or more embodiments of the present invention, it is possible to stabilize the flow ratio, thereby improving measurement accuracy of the flow measuring device.

In a flow measuring device according to one aspect of the present invention, a stopper section is provided in a projecting manner in the circumference surface of the space of the flow channel block that configures the main flow channel, positioning is carried out by the orifice being brought into contact with the stopper section, and the orifice is sandwiched and held between an end surface of the orifice holding member and the stopper section. According to this aspect, as the orifice is positioned so as to be in contact with the stopper section provided in the projecting manner within the main flow channel, it is possible to increase positioning accuracy of the orifice, thereby reducing the variation of the flow ratio.

Moreover, according to this aspect, the holding member containing portion having an even cross-sectional shape may be provided in a depressed manner in the circumference surface of the space of the flow channel block that configures the main flow channel from the stopper section to one end surface of the flow channel block, a cut-out section may be formed on the orifice holding member over an entire length direction of the orifice holding member, and the orifice holding member may be inserted into the holding member containing portion so as to contain the wall surface other than the area where the holding member containing portion is formed out of the main flow channel in the cut-out section of the orifice holding member. According to this aspect, as even a hard or rigid orifice holding member can be easily inserted into the holding member containing portion, it is possible to securely fix the orifice using the hard or rigid orifice holding member.

Furthermore, according to the above aspect, the holding member containing portion having an even cross-sectional shape may be provided in the circumference surface of the space of the flow channel block that configures the main flow channel from the stopper section to one end surface of the flow channel block, a cut-out section may be formed on the orifice holding member at a part of the orifice holding member in a length direction, and the orifice holding member may be inserted into the holding member containing portion so as to contain the wall surface other than the area where the holding member containing portion is formed out of the main flow channel in the cut-out section of the orifice holding member. According to this aspect, as even a hard or rigid orifice holding member can be easily inserted into the holding member containing portion, it is possible to securely fix the orifice using the hard or rigid orifice holding member.

In a flow measuring device according to one aspect of the present invention, a groove-shaped holding member containing portion is provided in the circumference surface of the space of the flow channel block that configures the main flow channel, a projected portion is provided on an outer circumference surface of the orifice, the orifice is contained within the main flow channel by fitting the projected portion into the holding member containing portion, and the orifice is held by the orifice holding member in a stick shape inserted into the holding member containing portion. According to this aspect, as the orifice can be held by the orifice holding member having a small cross-sectional area, it is possible to stabilize the flow of the gaseous body.

In a flow measuring device according to one aspect of the present invention, the orifice within the main flow channel is held by being sandwiched by the orifice holding member fitted into the holding member containing portion from one opening of the main flow channel and another orifice holding member fitted into the holding member containing portion from the other opening of the main flow channel. According to this aspect, as the orifice is fixed by sandwiching the orifice by the orifice holding members on the both sides, the stopper section for positioning the orifice within the main flow channel is not necessary, and it is possible to hold the orifice at any position by adjusting the length of the orifice holding members on the both sides, thereby allowing the adjustment of the flow ratio.

In a flow measuring device according to one aspect of the present invention, the orifice holding member is configured by a plurality of orifice holding members. According to this aspect, as the orifice holding member is divided into a plurality of pieces, a number of the orifice holding members can be adjusted depending on the thickness of the orifice. When the plurality of the orifice holding members are provided respectively for the front and back sides of the orifice, it is possible to change the position of the orifice by adjusting the number of the orifice holding members on the both sides. Thus, it is possible to easily adjust the flow ratio.

In a flow measuring device according to one aspect of the present invention, an end surface of the orifice holding member is pressed by an end cap attached to the end surface of the flow channel block. According to this aspect, as the end surface of the orifice holding member is pressed by the end cap, it is possible to prevent the orifice holding member from dropping off with the end cap.

Moreover, according to this aspect, a resilient member can be sandwiched between the end surface of the orifice holding member and the end cap. By sandwiching the resilient member between the end surface of the orifice holding member and the end cap, it is possible to press the orifice holding member against the orifice by the resilient repulsion of the resilient member, thereby securely holding the orifice.

In a flow measuring device according to one aspect of the present invention, the flow channel block is configured by assembling a main flow channel portion and an auxiliary flow channel portion that are component parts separate from each other, the main flow channel is formed at the main flow channel portion, and the auxiliary flow channel is formed at the auxiliary flow channel portion. According to this aspect, the auxiliary flow channel portion can be replaced depending on an intended purpose. Further, a flow measuring device that is available in the market or an existing flow measuring device provided with a flow detection element provided on a single flow channel can be used as the auxiliary flow channel portion.

BRIEF DESCRIPTION OF THE DRAWINGS

FIG. 7 is a table showing results of an experiment of a relationship between positional displacement of a vent hole of the collar and a changing rate of a flow ratio, using 6 flow measuring devices as samples;

DETAILED DESCRIPTION

Hereinafter, preferred embodiments of the present invention will be described with reference to the drawings. However, the present invention is not limited to the embodiments described below, and various modifications can be made as long as these modifications do not depart from the spirit of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1A:
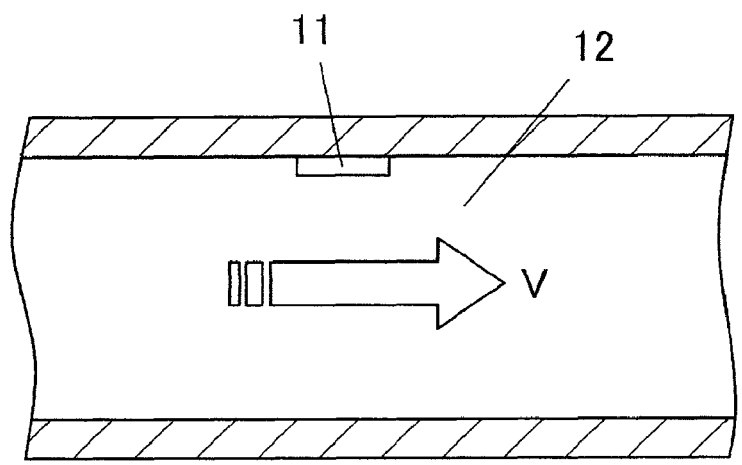
FIGS. 1A and 1B are schematic cross-sectional views for illustrating a measurement principle of a straight-tube type flow measuring device.
Figure 1B:
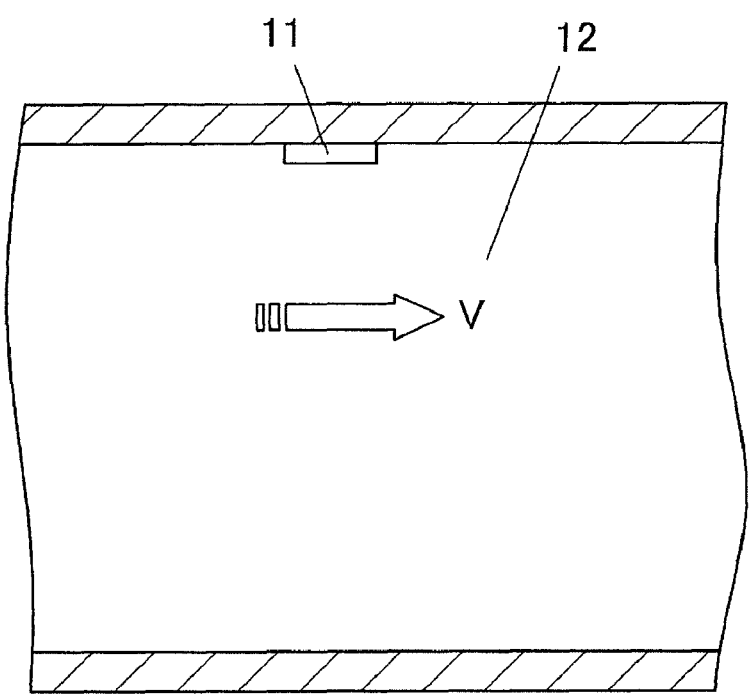
Figure 2:
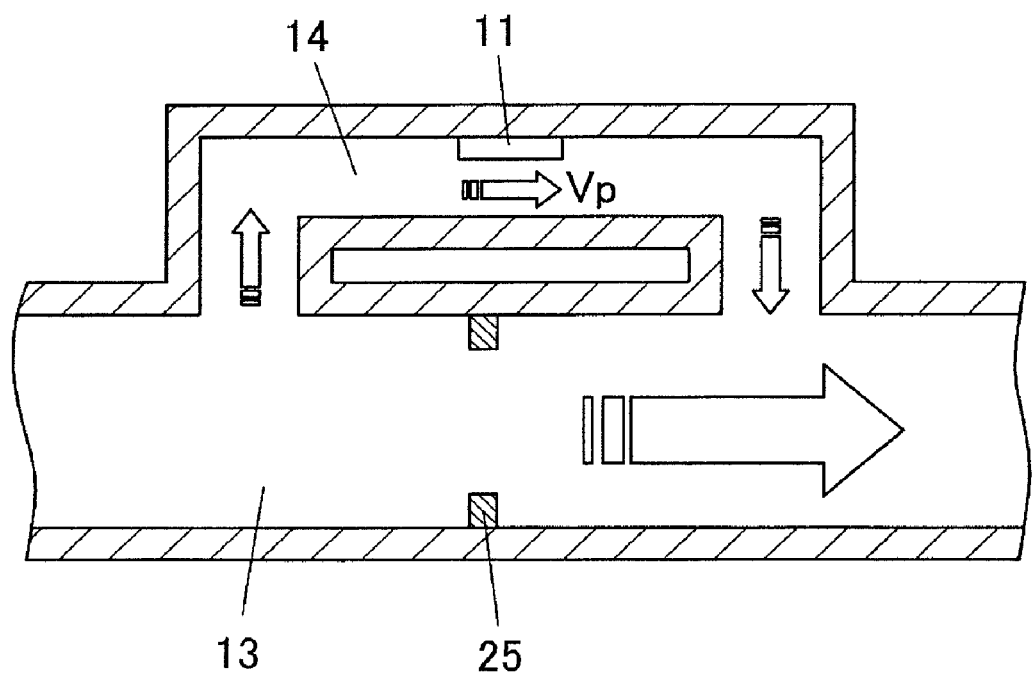
FIG. 2 is a schematic cross-sectional view for illustrating a measurement principle of a flow measuring device of a bypass flow channel structure.
Figure 3:
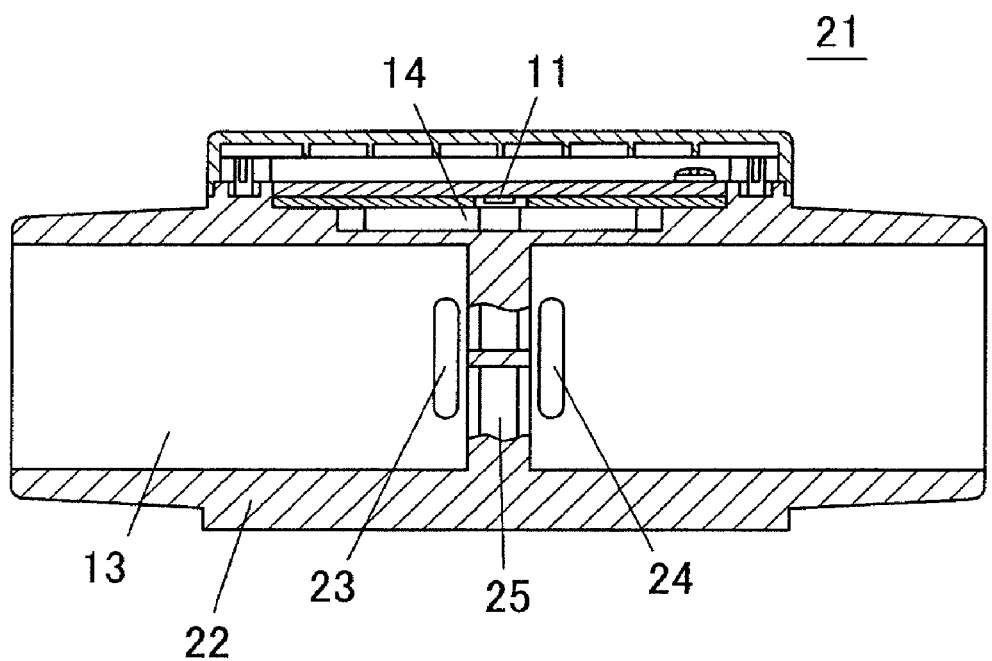
FIG. 3 is a partially broken cross-sectional view of a flow measuring device disclosed in Japanese Patent No. 3870969.
Figure 4:
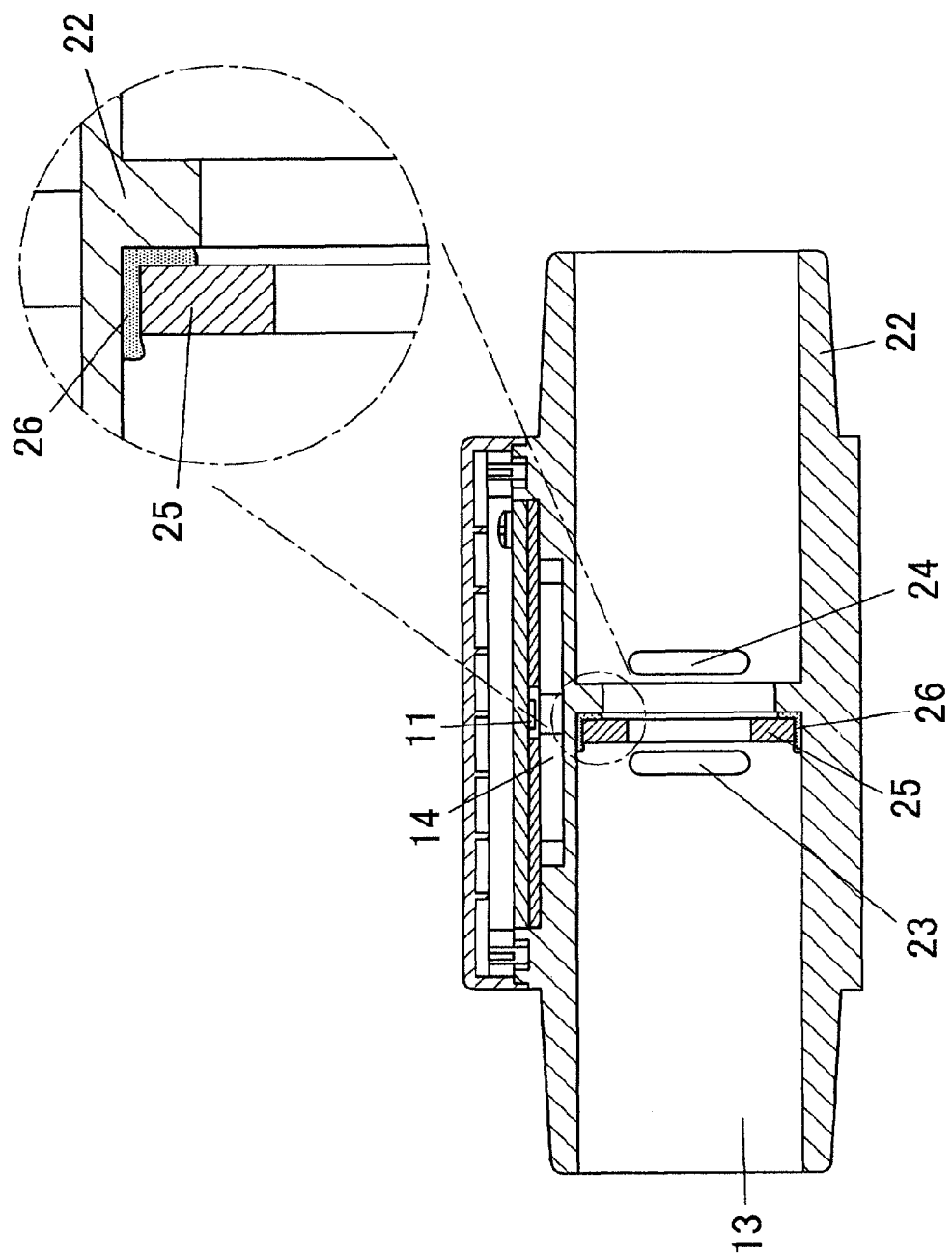
FIG. 4 is a cross-sectional view illustrating an improved example of the flow measuring device disclosed in Japanese Patent No. 3870969.
Figure 5:
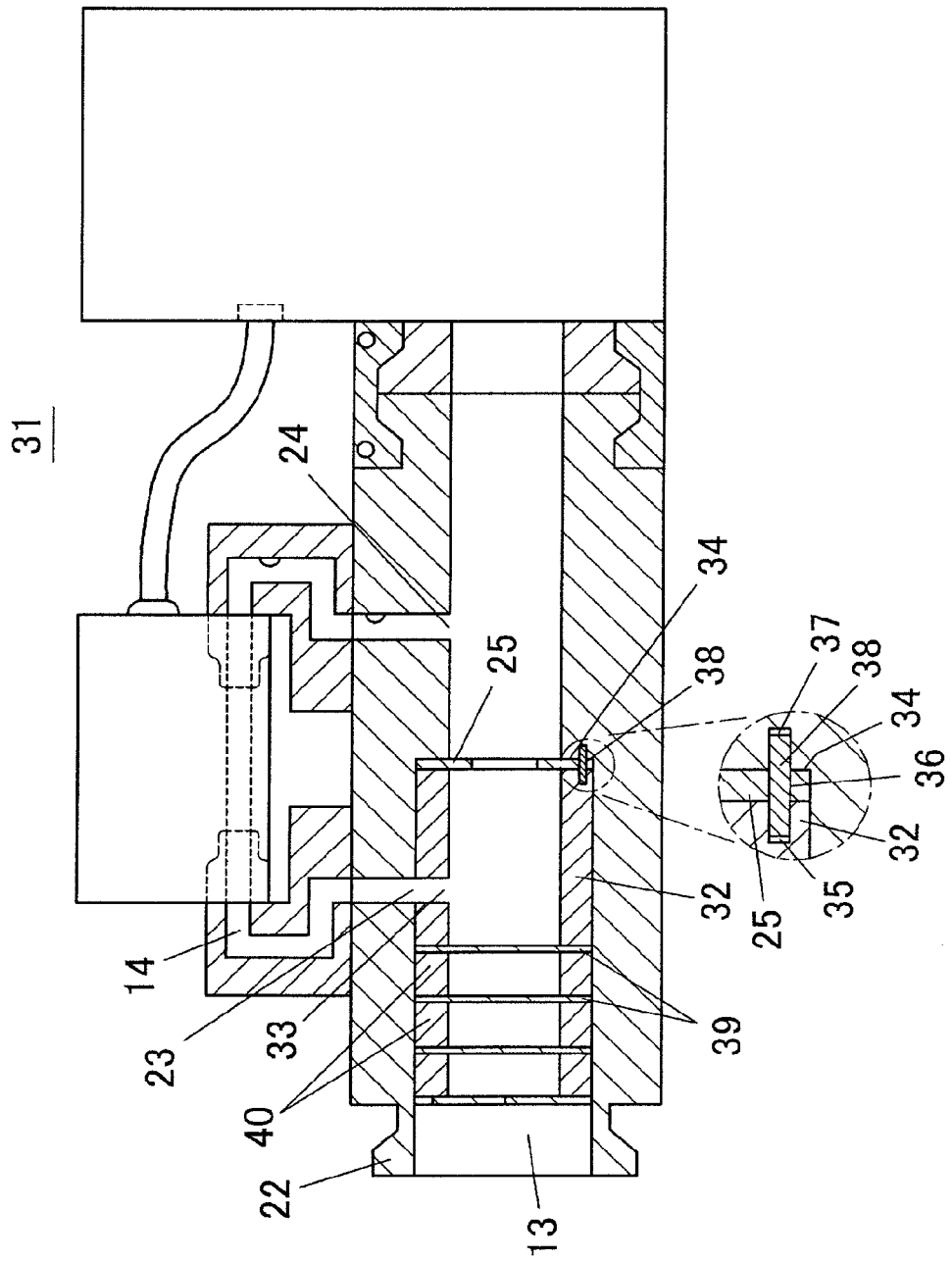
FIG. 5 is a schematic cross-sectional view of a flow measuring device disclosed in Japanese Unexamined Patent Publication No. 2004-355045.
Figure 6A:
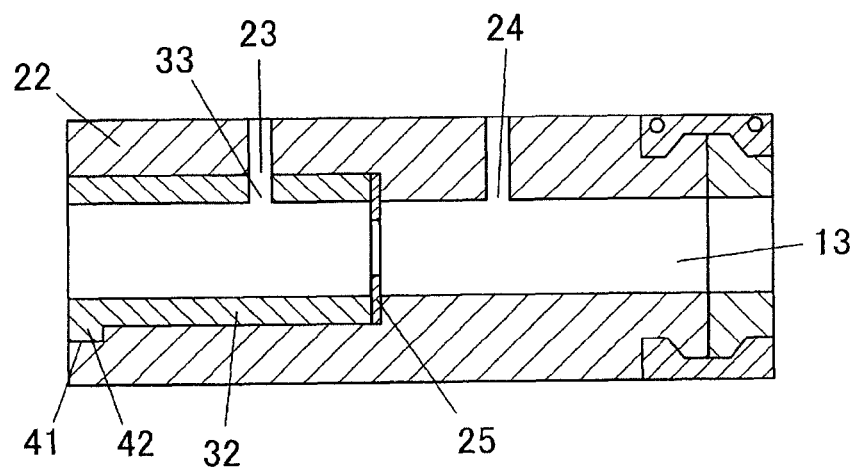
FIGS. 6A and 6B are respectively a schematic cross-sectional view illustrating an improved example of the flow measuring device disclosed in Japanese Unexamined Patent Publication No. 2004-355045 and a perspective view illustrating a collar used for the flow measuring device shown in FIG. 6A.
Figure 6B:
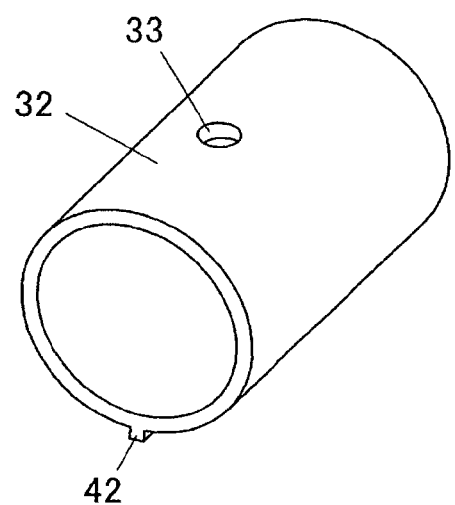
Figure 8A:
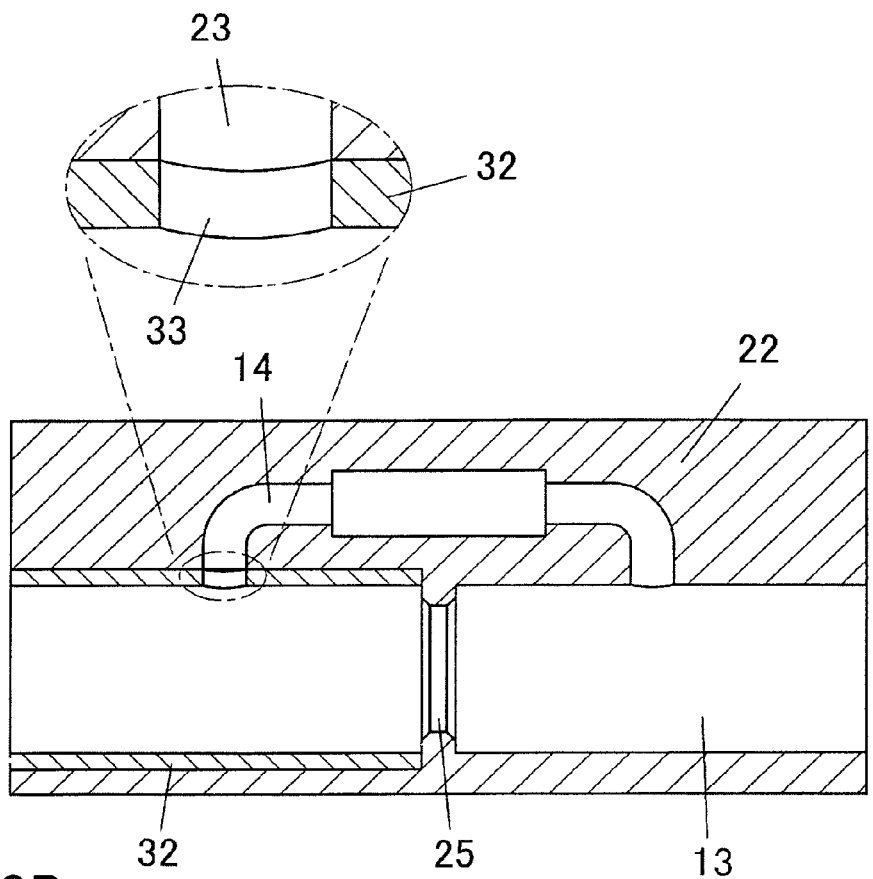
FIGS. 8A and 8B are schematic diagrams respectively illustrating a structure of the samples No. 1 and No. 4 shown in FIG. 7.
Figure 8B:
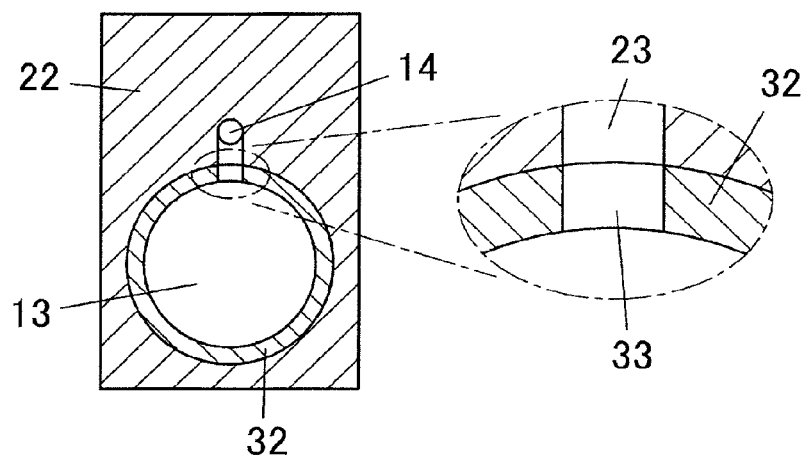
Figure 9A:
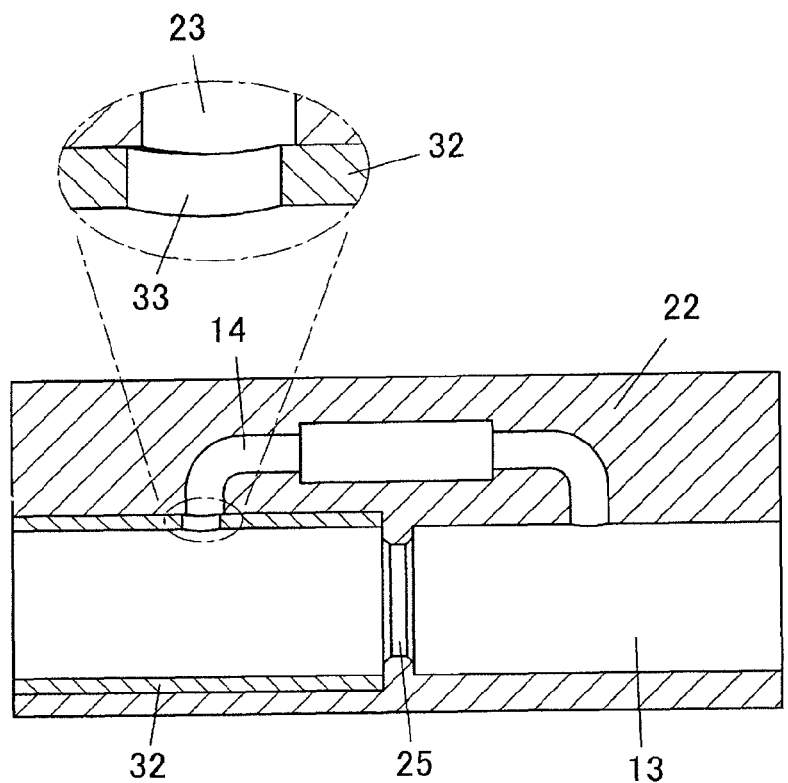
FIGS. 9A and 9B are schematic diagrams respectively illustrating a structure of the samples No. 2 and No. 5 and a structure of the samples No. 3 and No. 6 shown in FIG. 7.
Figure 9B:
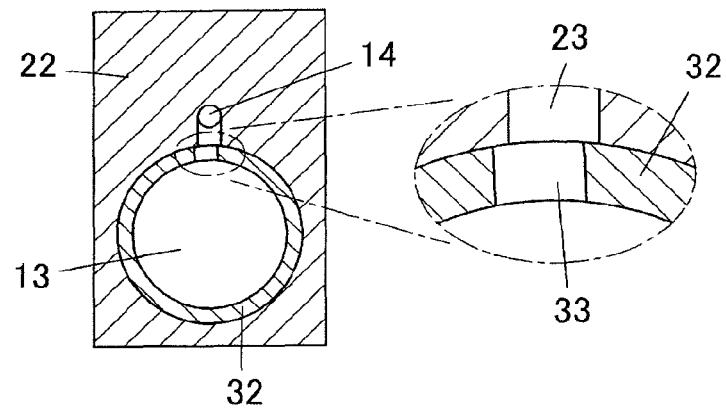
Figure 10:
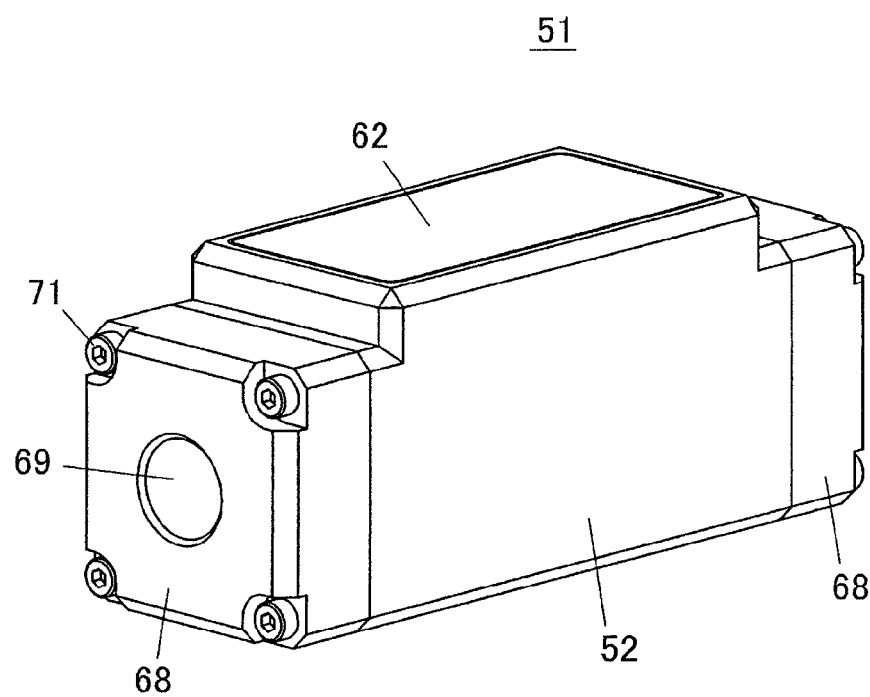
FIG. 10 is an external perspective view of a flow measuring device according to a first embodiment of the present invention.
Figure 11A:
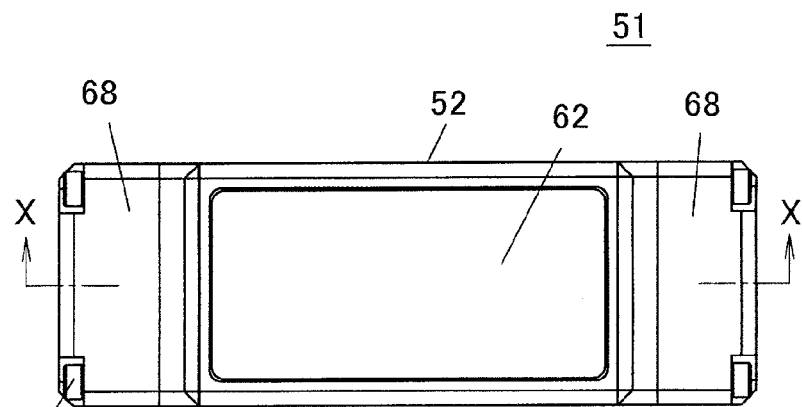
FIGS. 11A, 11B, and 11C are respectively a plan view of the flow measuring device according to the first embodiment, a cross-sectional view taken along line X-X of FIG. 11A, and a cross-sectional view taken along line Y-Y of FIG. 11B.
Figure 11B:
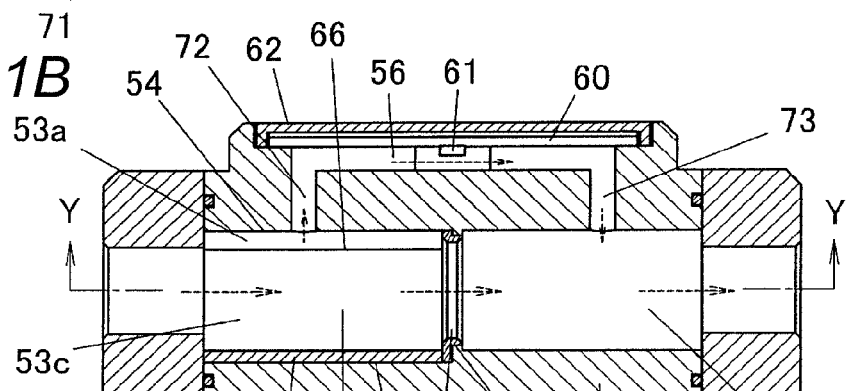
Figure 11C:
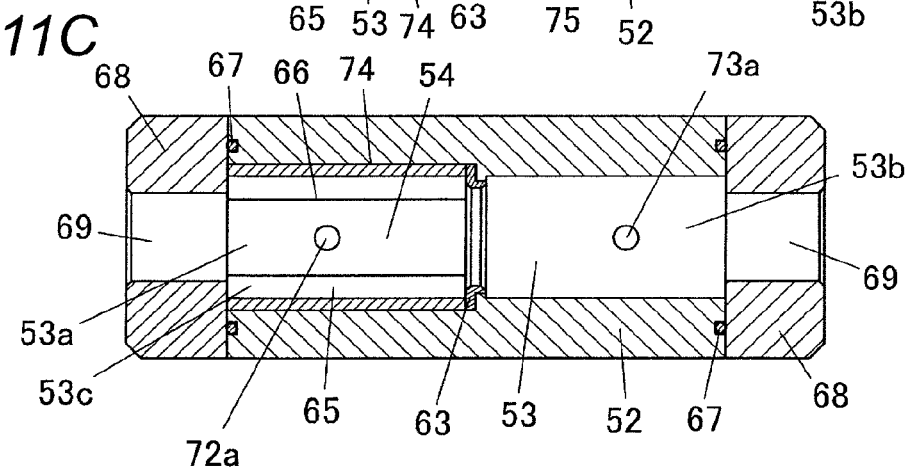
Figure 12:
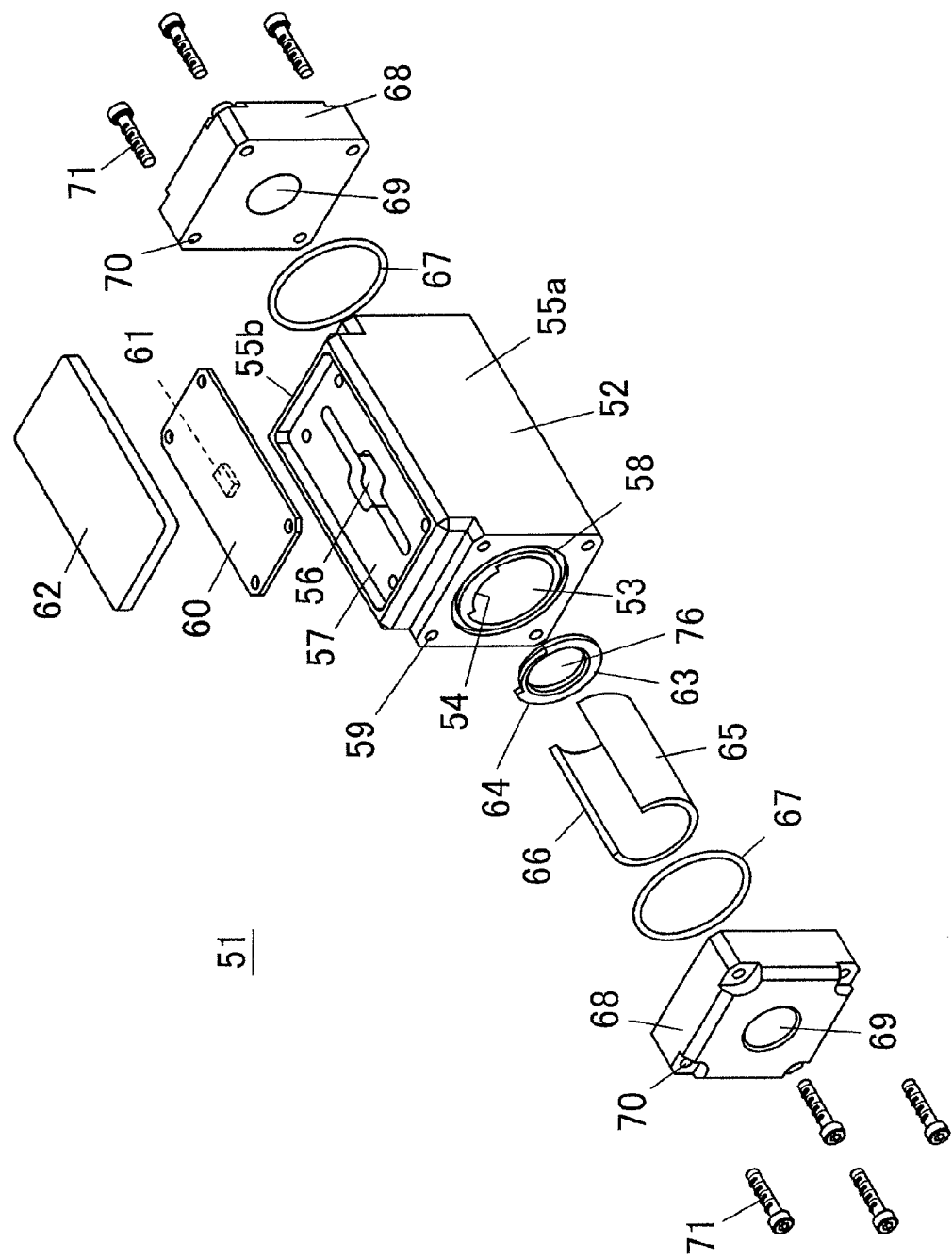
FIG. 12 is an exploded perspective view of the flow measuring device according to the first embodiment.

Hereinafter, a flow measuring device according to a first embodiment of the present invention is described with reference to FIG. 10 to FIG. 17. FIG. 10 is a perspective view illustrating a flow measuring device 51 of the first embodiment. FIG. 11A is a plan view illustrating the flow measuring device 51, FIG. 11B is a cross-sectional view taken along line X-X of FIG. 11A, and FIG. 11C is a cross-sectional view taken along line Y-Y of FIG. 11B. FIG. 12 is an exploded perspective view illustrating the flow measuring device 51.

As shown in FIG. 12, the flow measuring device 51 is mainly configured by a flow channel block 52 having a main flow channel 53 and an auxiliary flow channel 56, a circuit board 60 having a flow detection element 61, a cover 62, an orifice 63, an orifice supporting spacer 65 (orifice holding member), a pair of seal rings 67, and a pair of end caps 68.

Figure 13A:
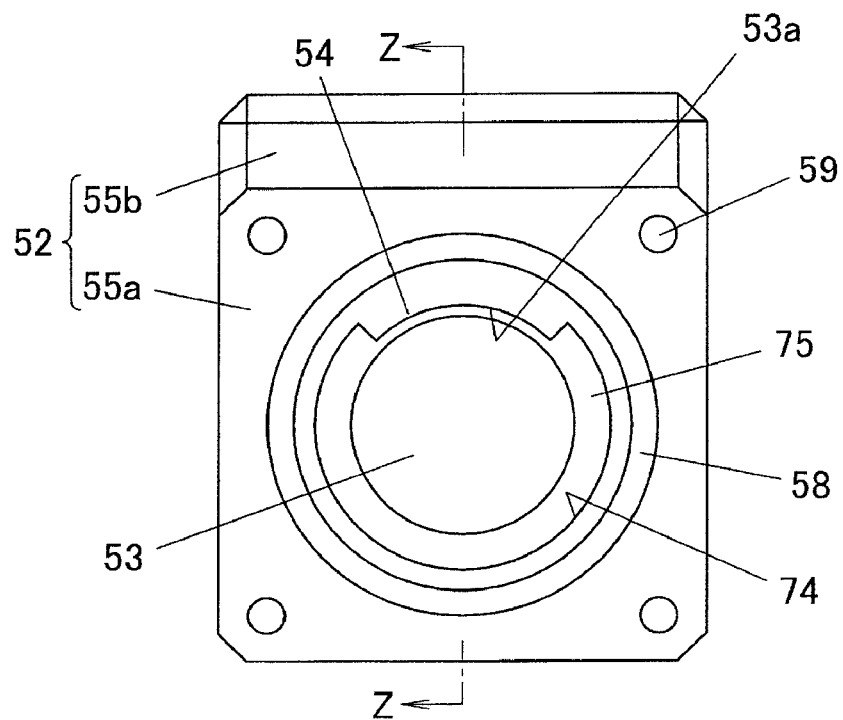
FIGS. 13A and 13B are respectively an elevational view and a back elevational view of the flow channel block shown in FIG. 12.
Figure 13B:
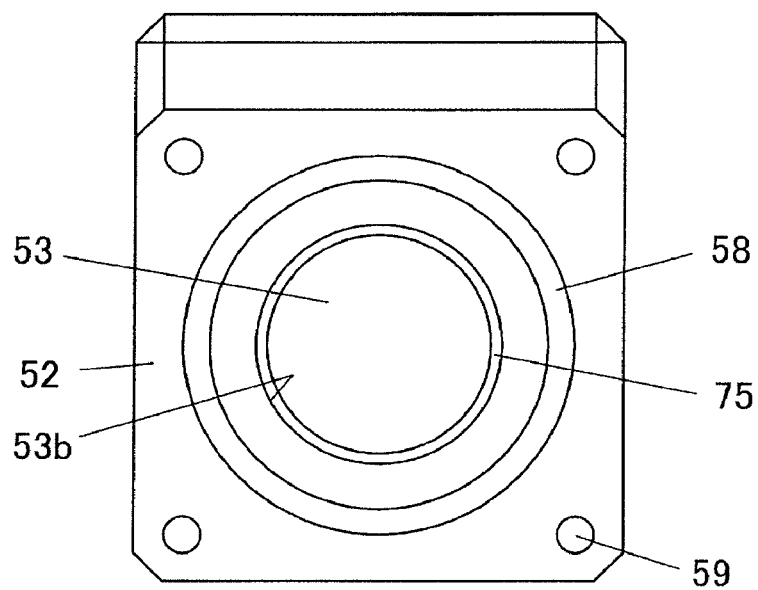
Figure 14A:
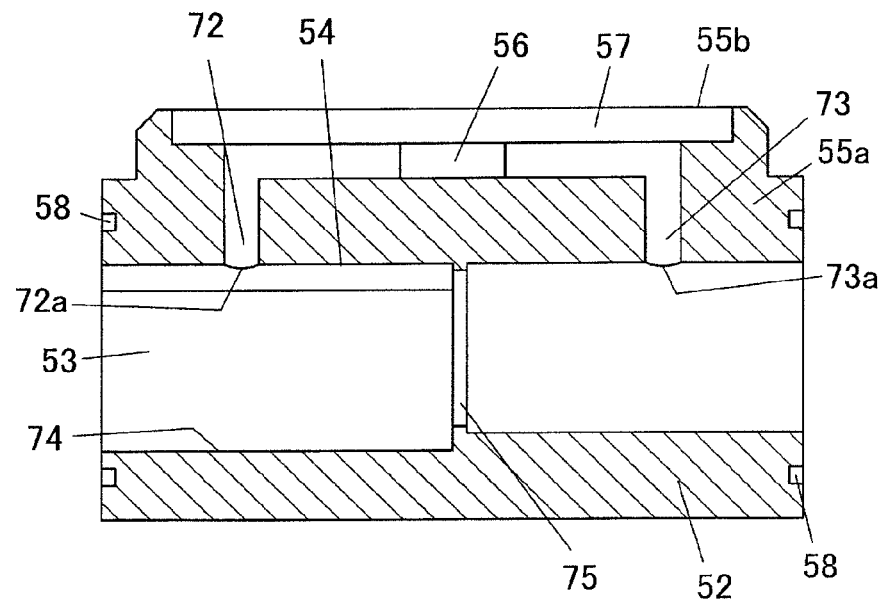
FIGS. 14A and 14B are respectively a cross-sectional view taken along line Z-Z of FIG. 13A, and a partially broken perspective view of this flow channel block.

First off, a structure of the flow channel block 52 that is used for the flow measuring device 51 shown in FIG. 12 is described. FIGS. 13A and 13B are an elevational view and a back elevational view of the flow channel block 52, respectively. FIG. 14A is a cross-sectional view taken along line Z-Z of FIG. 13A.

Figure 14B:
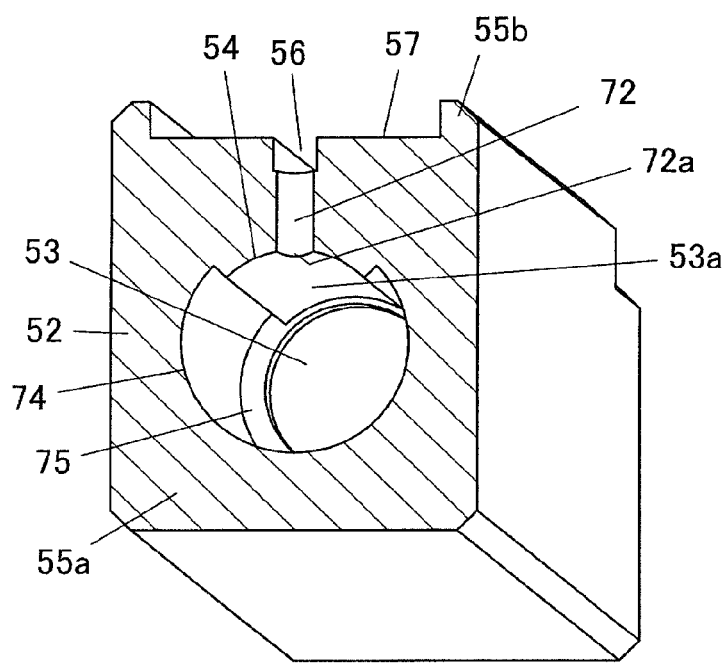

FIG. 14B is a perspective view of the flow channel block 52 that is cut along a portion passing a branch flow introduction channel 72. The flow channel block 52 is integrally formed by a main flow channel portion 55a that configures the main flow channel 53 and an auxiliary flow channel portion 55b that configures the auxiliary flow channel 56, and molded by a synthetic resin.

As shown by FIG. 14A, the main flow channel portion 55a includes the main flow channel 53 that penetrates through a long a front-back direction. At a substantial center portion in an axial direction of the main flow channel 53, an annular stopper section 75 with which the orifice 63 is brought into contact projects from a wall surface of the main flow channel 53. As shown in FIG. 13A and FIG. 14B, at a portion on a forward side of the stopper section 75, an area of an inner surface of the main flow channel 53 excluding an upper surface thereof is removed to a certain depth from a plane that is flush with the wall surface of the main flow channel 53, and a spacer container 74 (holding member containing portion) having a C-shaped cross section is provided in a depressed manner. As a result, the spacer container 74 extends from the stopper section 75 to a front end surface of the main flow channel portion 55a along the axial direction with an even cross section. Further, a flow channel wall 54 that remains on an upper portion of the main flow channel 53 also extends from the stopper section 75 to the front end surface of the main flow channel portion 55a along the axial direction with an even cross section. As shown in FIGS. 13A and 13B, an annular ring holding groove 58 is formed on the front end surface and an end surface of the main flow channel portion 55a so as to surround an opening of the end surface of the main flow channel 53. On an external side of the ring holding groove 58, a thread hole 59 is formed at each of four corners of the front end surface and the end surface of the main flow channel portion 55a.

The auxiliary flow channel portion 55b is provided on an upper surface of the main flow channel portion 55a. As shown in FIG. 12 and FIGS. 14A and 14B, an auxiliary flow channel formation chamber 57 in a low-box-shaped appearance having an opening in its upper surface is formed on a substantially entirety of the auxiliary flow channel portion 55b. The auxiliary flow channel 56 extending in the front-back direction is formed on a bottom surface of the auxiliary flow channel formation chamber 57, and, within the flow channel block 52, the branch flow introduction channel 72 and a branch flow collection channel 73 extend respectively from both ends of the auxiliary flow channel 56 toward the main flow channel 53 perpendicularly. A branch entrance 72a at a lower end of the branch flow introduction channel 72 opens in a wall surface 53a of the flow channel wall 54 at a portion on the forward side of the stopper section 75 (that is, so as to be positioned on the forward side of the orifice 63 that will be later described). Similarly, a collection exit 73a at a lower end of the branch flow collection channel 73 opens in a top surface of the main flow channel 53 at a portion on a backward side of the stopper section 75.

Figure 15A:
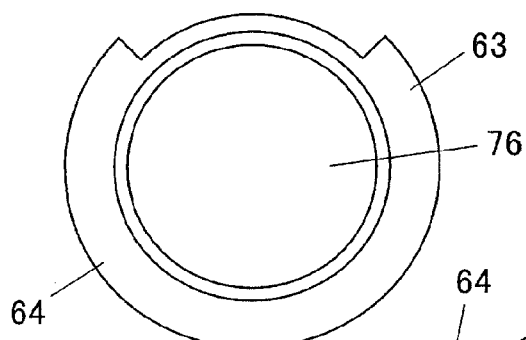
FIGS. 15A, 15B, and 15C are elevational views respectively of orifices with opening areas different from each other.
Figure 15B:
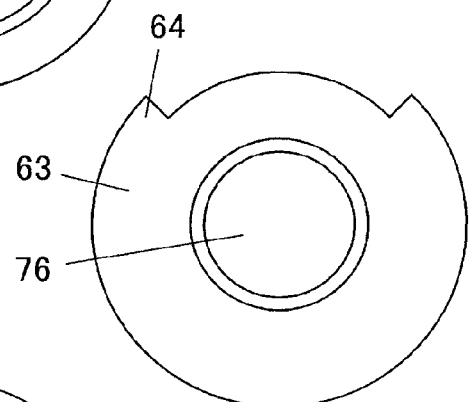
Figure 15C:
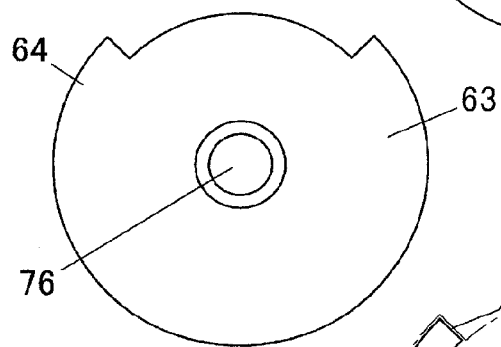

Next, the orifice 63 and the orifice supporting spacer 65 used for the flow measuring device 51 of FIG. 12 will be described. The orifice 63 includes a flange 64 around a portion of an outer circumference, and an opening 76 for controlling a flow of a gaseous body at a center. More than one type of the orifice 63 having a different area of the opening 76 (opening area), as shown in FIGS. 15A, 15B and 15C, for example, is provided according to a flow ratio between the main flow channel 53 and the auxiliary flow channel 56. While the orifices 63 illustrated in the drawing each have the opening 76 in a circular shape at a center portion, the orifice 63 can be an orifice having a number of holes in a honeycombed manner or a porous body having a number of minute holes addition to these examples. However, in the following description, an example having the orifice 63 with the circular opening 76 is described.

In any of the orifices 63, a radius from a center of the opening 76 to an edge at which the flange 64 is not present is equal to a radius from a center of the main flow channel 53 of the flow channel block 52 to the wall surface 53a of the flow channel wall 54. Further, the flange 64 is in the same shape and size as a cross-sectional shape of the spacer container 74 in the flow channel block 52, and a radius from the center of the opening 76 of the orifice 63 to the edge of the flange 64 is equal to a radius from a center of the main flow channel 53 of the flow channel block 52 to the spacer container 74. It should be noted that the edge of the opening 76 is formed in a tapered manner in order to make the passing of the gaseous body smooth.

Therefore, any of the orifices 63 can be contained within the main flow channel 53 by aligning the flange 64 with the spacer container 74, and the orifice 63 contained in the main flow channel 53 from the front end surface of the flow channel block 52 is positioned by being brought into contact with the stopper section 75.

The orifice supporting spacer 65 has a shape such that a part of a cylindrical shape is cut out all along a length direction, and includes a slit shaped cut-out section 66 over an entire length. An outer diameter of the orifice supporting spacer 65 is equal to a diameter of the spacer container 74, and a thickness of the orifice supporting spacer 65 is equal to a depth of the spacer container 74. A width of the cut-out section 66 is equal to a width of the flow channel wall 54. Further, a total length of a thickness of the orifice 63 and a length of the orifice supporting spacer 65 is equal to a distance between a front surface of the stopper section 75 and the front end surface of the flow channel block 52.

Figure 15D:
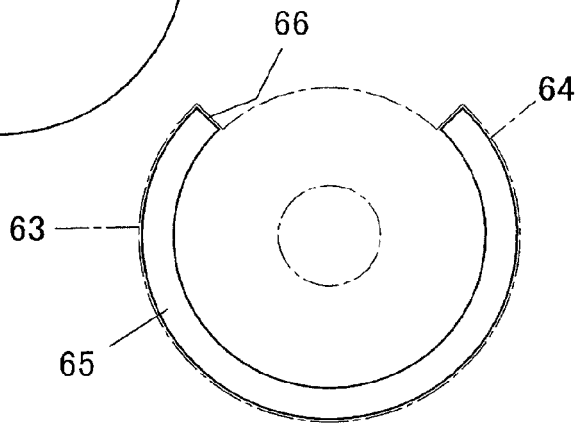
FIG. 15D is an elevational view of an orifice supporting spacer.
Figure 16A:
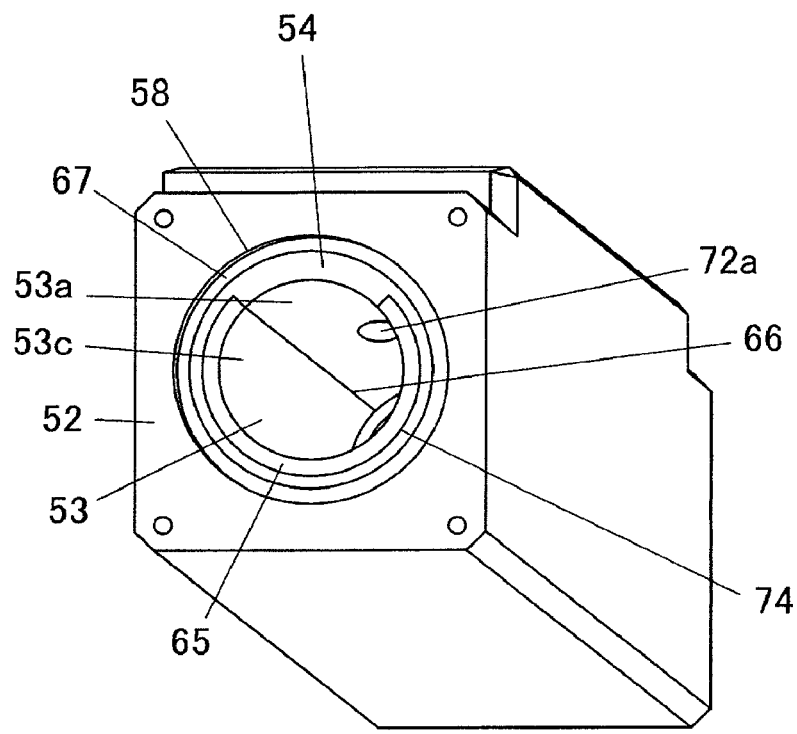
FIGS. 16A and 16B are respectively a perspective view and an elevational view of the flow channel block attached with the orifice, the orifice supporting spacer, and a seal ring.
Figure 16B:
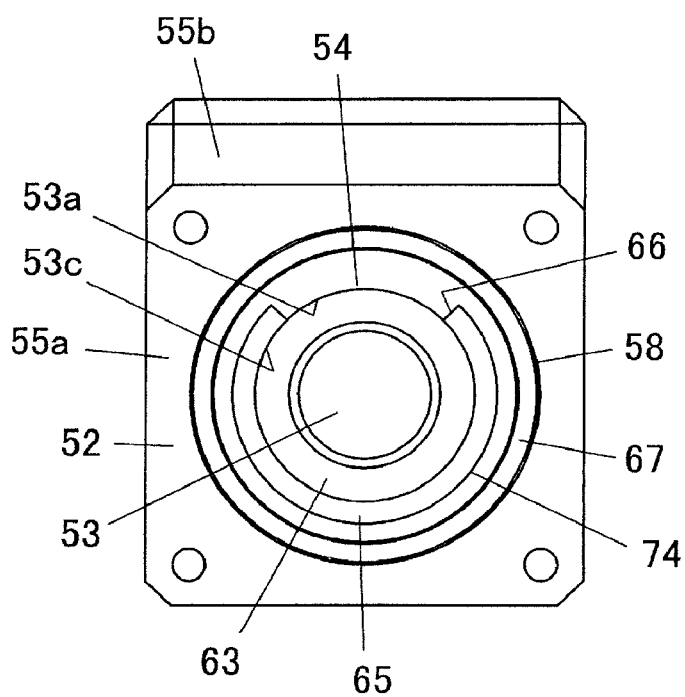

The orifice supporting spacer 65 can be inserted into the spacer container 74 by aligning the cut-out section 66 with the flow channel wall 54. A cross-sectional shape of the orifice supporting spacer 65 which is substantially C-shaped corresponds to a shape of the flange 64 of the orifice 63. Accordingly, when the orifice supporting spacer 65 is inserted into the spacer container 74 after the orifice 63, as shown in FIG. 15D, an end surface of the orifice supporting spacer 65 is brought into contact with the flange 64 of the orifice 63, thereby pressing the orifice 63. FIGS. 16A and 16B illustrate a state in which the orifice 63 and the orifice supporting spacer 65 are inserted into the main flow channel 53 in this manner.

In a state in which the orifice 63 and the orifice supporting spacer 65 are attached within the main flow channel 53 in this manner, the wall surface 53a of the flow channel wall 54 and an inner surface 53c of the orifice supporting spacer 65 configure the wall surface of the main flow channel 53 on a forward side of the stopper section 34. An inner diameter of the main flow channel 53 on the forward side (a diameter of the wall surface 53a and the inner surface 53c) is equal to an inner diameter of a wall surface 53b of the main flow channel 53 on a backward side of the stopper section 34. It should be noted that, in the example shown in the drawing, the cross section of the main flow channel 53 after the orifice supporting spacer 65 is attached is circular, the cross section of the main flow channel 53 can be polygonal (for example, square, pentagon, hexagon, octagon, or such).

Next, the auxiliary flow channel portion 55b will be described. As shown in FIG. 12, the flow detection element 61 is attached to a lower surface of the circuit board 60. On the other hand, an upper surface of the auxiliary flow channel 56 opens at the bottom surface of the auxiliary flow channel formation chamber 57. As shown in FIG. 11B, the circuit board 60 is disposed over the bottom surface of the auxiliary flow channel formation chamber 57, with the flow detection element 61 facing downward and with annular rubber gaskets (not shown in the drawing) therebetween that are provided so as to surround an opening area of the auxiliary flow channel 56, and the circuit board 60 is fixed to the auxiliary flow channel formation chamber 57 by means of such as thermal caulking or threading. As the circuit board 60 does not include a hole at least in a portion that faces the opening area of the auxiliary flow channel 56, the upper surface of the auxiliary flow channel 56 is hermetically sealed in an airtight manner by the circuit board 60. Further, the flow detection element 61 is contained in a portion that is partially wide within the auxiliary flow channel 56, and positioned at a predetermined position within the auxiliary flow channel 56. Then, an upper surface of the auxiliary flow channel portion 55b is blocked by the cover 62.

Figure 17A:
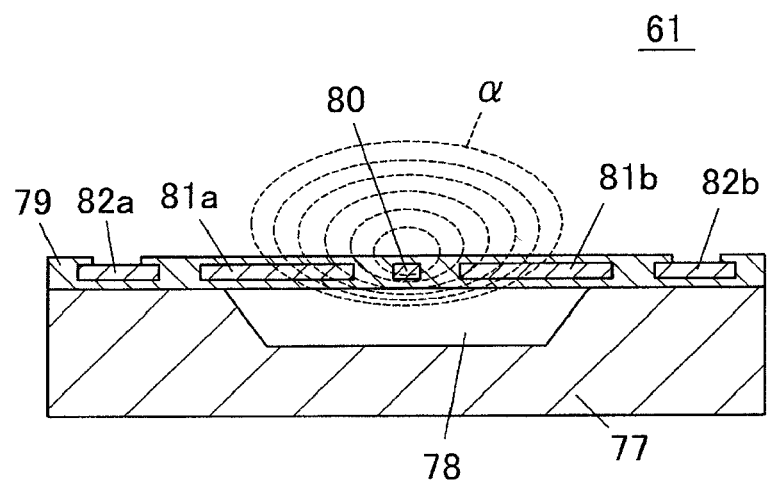
FIGS. 17A and 17B are schematic cross-sectional views respectively for illustrating a principle of flow amount detection by the flow detection element.

The flow detection element 61 can be of any type as long as it is possible to measure a flow velocity of the gaseous body. As the flow detection element 61, a flow sensor having a heater and a thermopile, for example, can be used. In the flow detection element 61, as shown in FIG. 17A, a cavity 78 is provided in an upper surface of a substrate 77 by etching, an insulating thin film 79 is disposed on the cavity 78, and an edge of the insulating thin film 79 is held with the substrate 77. A heater 80 is formed at a center portion of the insulating thin film 79 by polysilicon, and thermopiles 81a and 81b are respectively provided on an upstream side and a downstream side of the heater 80. The thermopiles 81a and 81b are provided by connecting linear elements of Al and linear elements of polysilicon alternately in a staggering manner. The thermopiles 81a and 81b are positioned symmetrically with respect to the heater 80, and respectively measure the temperature at positions that are symmetric with respect to the heater 80. Reference numerals 82a and 82b represent electrode pads of the heater 80 and the thermopiles 81a and 81b.

Figure 17B:
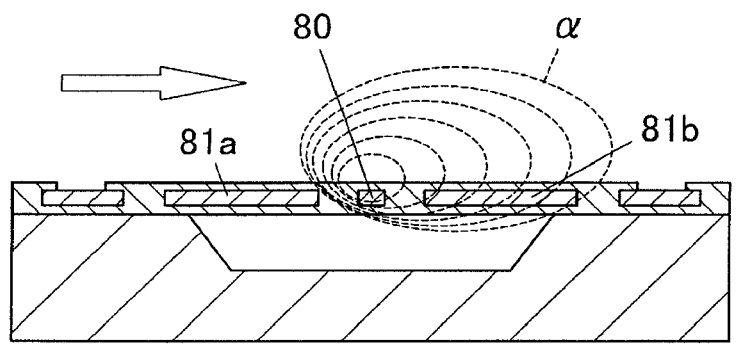

When carrying out measurement, the heater 80 generates heat at a predetermined temperature, and a predetermined temperature distribution a (thermal gradient) is produced around the heater 80. As the thermopiles 81a and 81b are positioned symmetrically, the temperature detected by the both thermopiles 81a and 81b are equal and a difference in the temperature becomes zero when the gaseous body does not flow over the heater 80 as shown in FIG. 17A. In contrast, when there is a flow of the gaseous body (indicated by an arrow) over the heater 80 as shown in FIG. 17B, the heat of the heater 80 is conveyed to the downstream side and the temperature distribution a shifts to the downstream side, and thus the temperature on the downstream side detected by the thermopile 81b rises and the temperature on the upstream side detected by the thermopile 81a decreases. As a result, it is possible to calculate the flow velocity of the gaseous body based on the difference in the temperature detected by the both thermopiles 81a and 81b.

Next, after the seal ring 67 is fitted into the ring holding groove 58 as shown in FIGS. 16A and 16B, the end cap 68 is attached to each end surface of the flow channel block 52, and a thread 71 inserted through a through hole 70 at each of the four corners is tightened into the thread hole 59 of the flow channel block 52, thereby fixing the end cap 68 to the flow channel block 52. As a result, the seal ring 67 is pressed between a back surface of the end cap 68 and an end surface of the flow channel block 52, thereby maintaining the airtightness between the end surface of the flow channel block 52 and the end cap 68. Further, it is possible, by pressing one end of the orifice supporting spacer 65 with the end cap 68, to press the other end of the orifice supporting spacer 65 against the orifice 63. A connecting port 69 of the end cap 68 is a portion for connecting a pipe and such through which the gaseous body is transferred, and communicates to the main flow channel 53. The flow measuring device 51 thus assembled is illustrated in FIG. 10 and FIG. 11. Dimensions of the flow measuring device 51 are, for example, 80 mm in length, 30 mm in width, and 35 mm in height.

In the flow measuring device 51 thus configured, as shown by an arrow in FIG. 11B, when the gaseous body flows from the connecting port 69 into the main flow channel 53, a difference in pressure is produced in front and back of the orifice 63 due to a resistance when the gaseous body passes through the orifice 63. Because of this difference in pressure, a part of the gaseous body that flows through the main flow channel 53 is directed to the auxiliary flow channel 56 passing through the branch flow introduction channel 72, and the gaseous body that has passed through the auxiliary flow channel 56 again joins the main flow channel 53 through the branch flow collection channel 73. Then, when the gaseous body is directed to and flows through the auxiliary flow channel 56, a flow amount of the gaseous body that flows through the auxiliary flow channel 56 is measured by the flow detection element 61, and a total flow amount is calculated based on a flow ratio between a flow amount of the gaseous body that flows through the main flow channel 53 and the flow amount of the gaseous body that flows through the auxiliary flow channel 56. It should be noted that, according to the flow measuring device 51, the gaseous body can be introduced from a side of the front surface or from a side of the back surface, and can be used in a bi-directional manner.

According to such a bypass structure, a flow channel cross-sectional area of the main flow channel 53 can be reduced even in a case of the flow measuring device 51 for measuring a large flow amount, and it is possible to downsize the flow measuring device 51. Further, according to the flow measuring device 51, it is possible to change the flow ratio between the main flow channel 53 and the auxiliary flow channel 56, for example, by using the orifice 63 with a different opening area, as shown in FIGS. 15A-15C, depending on a flow amount range to be measured. Therefore, it is possible to adjust the flow velocity of the gaseous body within the auxiliary flow channel 56 so as to fall within a range measurable by the flow detection element 61 (a range in which an output is linear). Thus, it is possible to provide flow measuring devices of various flow amount ranges according to a customer demand and purpose, as well as to commoditize component parts other than the orifice 63, that is, component parts such as the flow channel block 52, and to reduce manufacturing cost for the flow measuring device 51.

Further, with the flow measuring device 51 having such a structure, the branch entrance 72a that continues to the auxiliary flow channel 56 overlapping with the orifice supporting spacer 65, or the branch entrance 72a interfering with the orifice supporting spacer 65, may not occur. In addition, the wall surface of the main flow channel 53 is configured as a smooth and even plane formed by the wall surface 53a of the flow channel wall 54 and the inner surface 53c of the orifice supporting spacer 65 (cylindrical surface, in the drawing). Therefore, the flow of the gaseous body through the main flow channel 53 is maintained stably, and it is easily possible to maintain the flow ratio between the flow amount through the main flow channel 53 and the flow amount through the auxiliary flow channel 56 constant, thereby improving the measurement accuracy of the flow amount by the flow measuring device 51.

Modified Examples of First Embodiment

Figure 18:
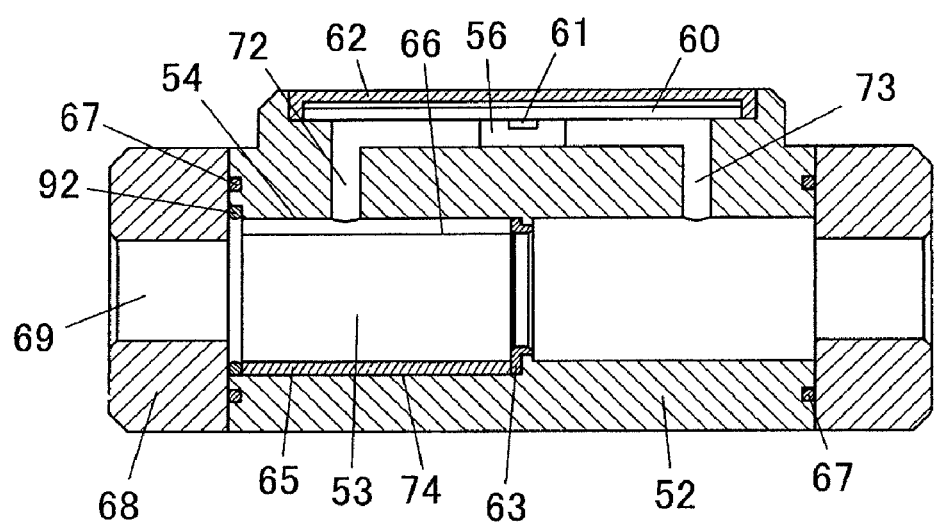
FIG. 18 is a cross-sectional view illustrating a modified example of the flow measuring device according to the first embodiment.

FIG. 18 is a cross-sectional view illustrating a modified example of the first embodiment. According to a flow measuring device 91, as compared to the case of the first embodiment, the distance between the orifice supporting spacer 65 and the flow channel wall 54 is slightly decreased, and the end surface of the orifice supporting spacer 65 and the end surface of the flow channel wall 54 are slightly recessed from the front end surface of the main flow channel portion 55a. Then, a resilient members 92 such as an O-ring is sandwiched between the end surface of the orifice supporting spacer 65 and the end surface of the flow channel wall 54 and the back surface of the end cap 68, thereby press-tightening the resilient member 92. According to this modified example, as the orifice supporting spacer 65 can be pressed against the orifice 63 by resilient repulsion of the resilient member 92, it is possible to make the orifice 63 to be held without fail.

Further, such as a dust protection net (not shown in the drawing) can be sandwiched between the respective end surfaces of the orifice supporting spacer 65 and the flow channel wall 54 and the back surface of the end cap 68, in addition to the resilient member 92.

Figure 19:
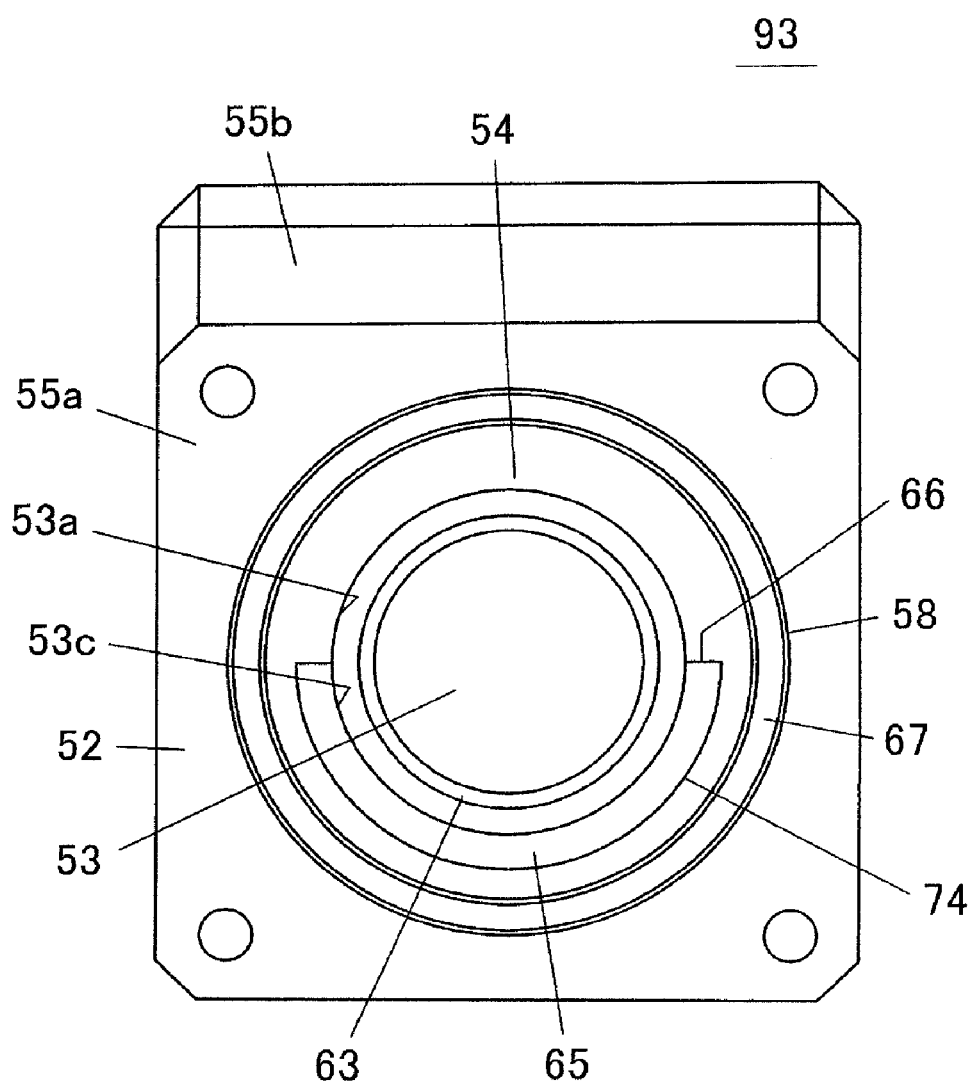
FIG. 19 is an elevational view illustrating another modified example of the flow measuring device according to the first embodiment, from which an end cap is removed.

FIG. 19 shows an elevational view illustrating a different modified example of the first embodiment, in a state in which the end cap 68 is removed. According to a flow measuring device 93 of the modified example, the orifice supporting spacer 65 is formed to have a semicircular cross section, and the flange 64 of the orifice 63 and the spacer container 74 are also formed to be in a semicircular shape according to this shape. In a case in which the orifice 63 is made by metal and such and has certain rigidity, there is no particular problem if the cross section of the orifice supporting spacer 65 is decreased as long as the orifice 63 is partially pressed by the orifice supporting spacer 65.

Figure 20A:
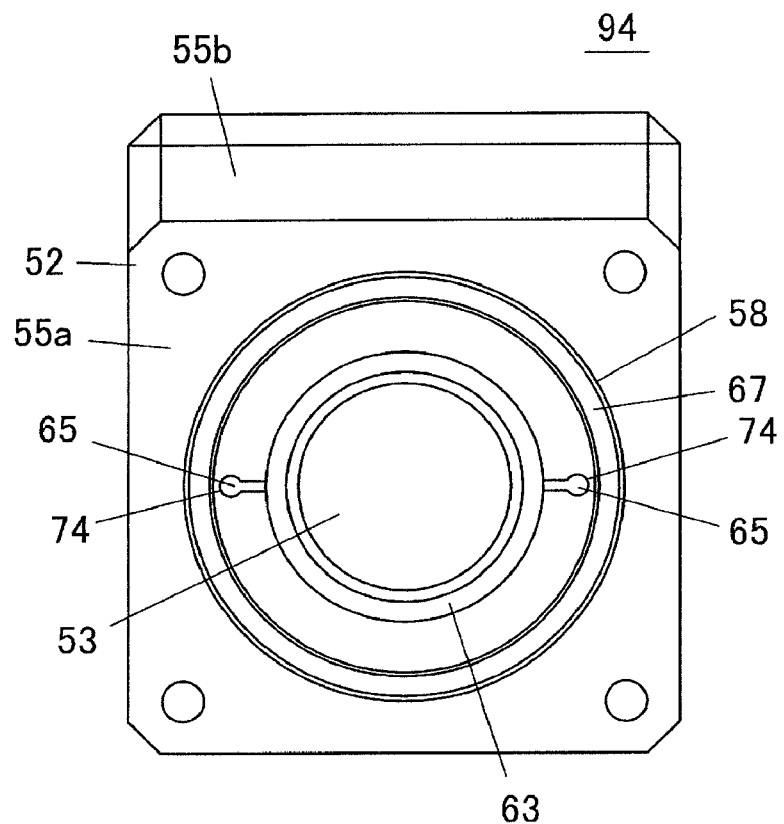
FIGS. 20A and 20B are respectively an elevational view of a further different modified example of the flow measuring device according to the first embodiment, from which the end cap is removed, and an elevational view of an orifice and an orifice supporting spacer that are used for this modified example.
Figure 20B:
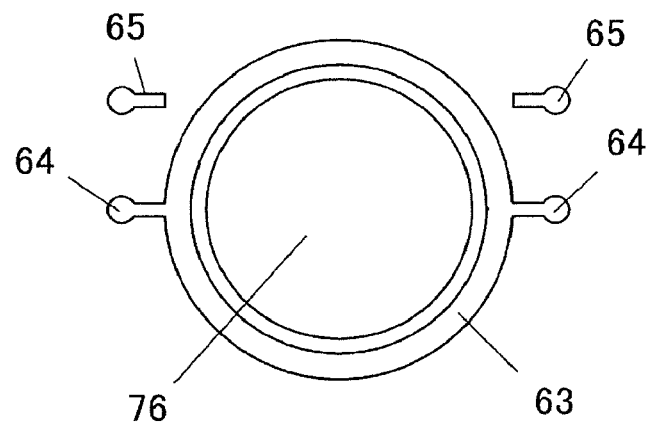

A modified example as shown in FIGS. 20A and 20B (a flow measuring device 94) is such that the cross-sectional area of the orifice supporting spacer 65 and the flange 64 are further reduced in size. Specifically, as shown in FIG. 20B, the flange 64 in a projected shape (projected portion) is provided on either side of the orifice 63, and two orifice supporting spacers 65 are formed to have a stick-shaped cross-section that is the same as the shape of the flange 64. Further, the spacer container 74 having the same cross section as that of the flange 64 is formed in a groove shape on either side of the main flow channel 53. Then, as shown in FIG. 20A, after the flange 64 is fitted into the spacer container 74 and the orifice 63 is contained within the main flow channel 53, the orifice supporting spacers 65 are inserted into the spacer containers 74 respectively on right and left, thereby holding the orifice 63. It should be noted that, cross-sectional shapes of the orifice supporting spacer 65 and the spacer container 74 are formed in a shape such that the orifice supporting spacer 65 may not drop off from the spacer container 74 into the main flow channel 53.

According to the modified examples as shown in FIG. 19 and FIG. 20, the cross-sectional area of the orifice supporting spacer 65 is reduced, and it is possible to increase a distance between a boundary between the edges of the orifice supporting spacer 65 and the flow channel wall 54 and the branch entrance 72a. Therefore, even if the flow of the gaseous body is disturbed at the boundary between the edges of the orifice supporting spacer 65 and the flow channel wall 54, the disturbance hardly influences the gaseous body that flows into the branch entrance 72a and the flow ratio can be stabilized.

Figure 21A:
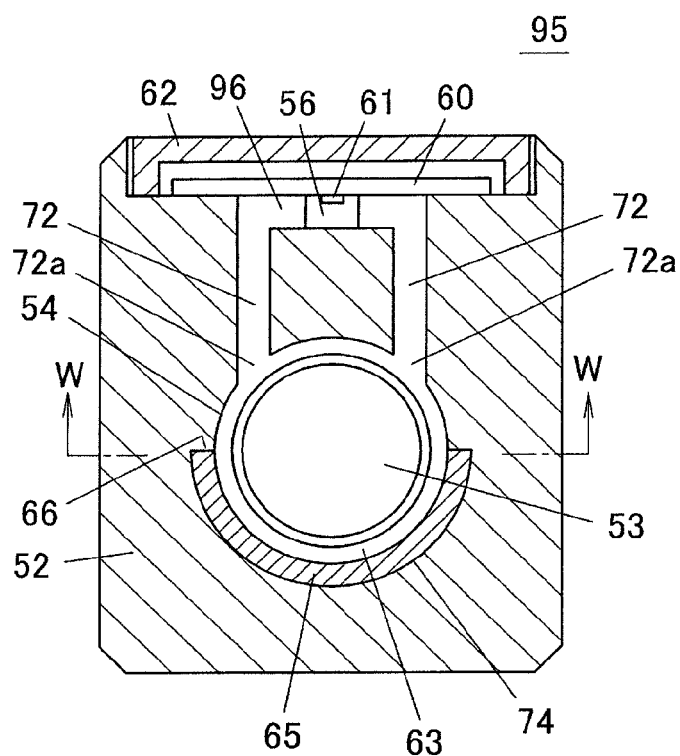
FIGS. 21A and 21(b) are respectively a cross-sectional view of a further different modified example of the flow measuring device according to the first embodiment, and a cross-sectional view taken along line W-W in FIG. 21A.
Figure 21B:
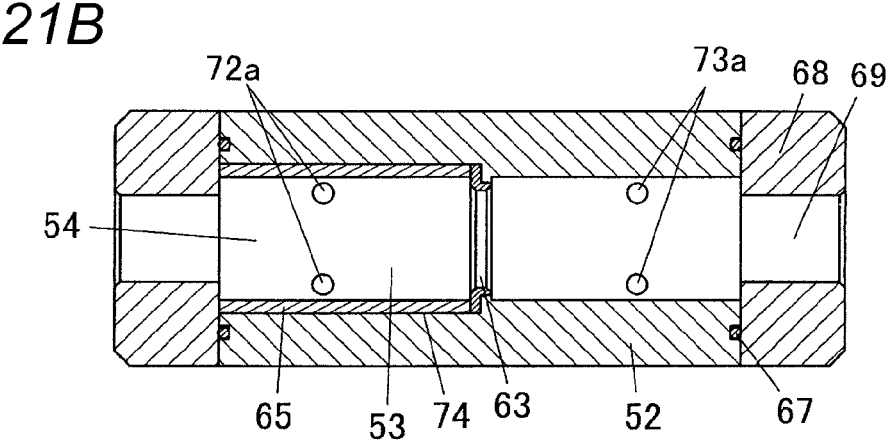
Figure 22:
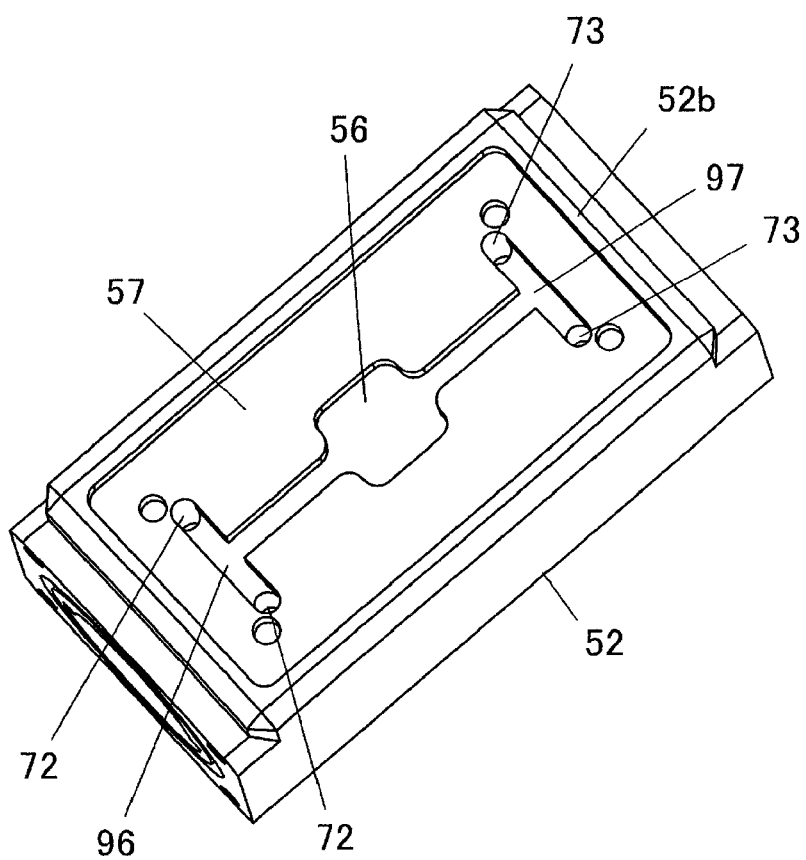
FIG. 22 is a perspective view of a flow channel block that is used for the above flow measuring device.

FIG. 21A is a cross-sectional view illustrating a flow measuring device 95 of a further different modified example according to the first embodiment, and FIG. 21B is a cross-sectional view taken along line W-W of FIG. 21A. Further, FIG. 22 is a perspective view illustrating the flow channel block 52 of the flow measuring device 95. In this modified example, the branch entrance 72a at the lower end is configured to open at the wall surface 53a of the flow channel wall 54, thereby perpendicularly forming two branch flow introduction channels 72. A confluence channel 96 is horizontally provided so as to connect between upper ends respectively of the branch flow introduction channels 72 on right and left at the bottom surface of the auxiliary flow channel formation chamber 57. Similarly, a distributor channel 97 is horizontally provided so as to connect between upper ends respectively of the branch flow collection channels 73 on right and left. Further, the auxiliary flow channel 56 is provided so as to connect between a center of the confluence channel 96 and a center of the distributor channel 97.

According to the flow measuring device 95, a part of the gaseous body that flows through the main flow channel 53 is directed from the two branch entrances 72a through the branch flow introduction channels 72 into the confluence channel 96, the gaseous body that flows into the confluence channel 96 from the both ends is directed to the auxiliary flow channel 56 from its center portion, and the flow amount is measured by the flow detection element 61 when passing through the auxiliary flow channel 56. Then, the gaseous body that has passed the auxiliary flow channel 56 flows into the distributor channel 97 and is divided right and left, flows back to the main flow channel 53 from the collection exit 73a after passing through the branch flow collection channel 73, and then flows along with the gaseous body that has passed the main flow channel 53.

Therefore, according to such a structure, it is possible to measure the flow velocity of the gaseous body by the flow detection element 61 after collecting the gaseous body directed from the two branch entrances 72a to the single auxiliary flow channel 56 and averaging biases of distribution of the flow velocity distribution. Therefore, it is possible to stabilize the flow amount of the auxiliary flow channel 56, and to improve the measurement accuracy of the flow amount.

It should be noted that, the structure of the flow channel in the auxiliary flow channel portion 55b is not particularly limited, and the structure as disclosed in Japanese Patent No. 3870969 and Japanese Unexamined Patent Publication No. 2008-222992 can be used other than the structures that are shown in FIG. 21 and FIG. 22.

Second Embodiment

Figure 23:
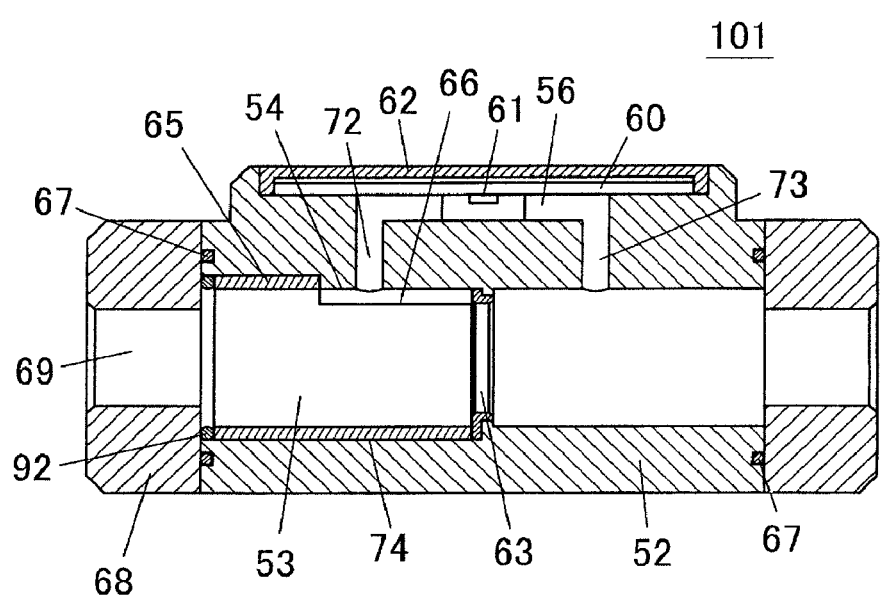
FIG. 23 is a cross-sectional view illustrating a flow measuring device according to a second embodiment of the present invention.
Figure 24:
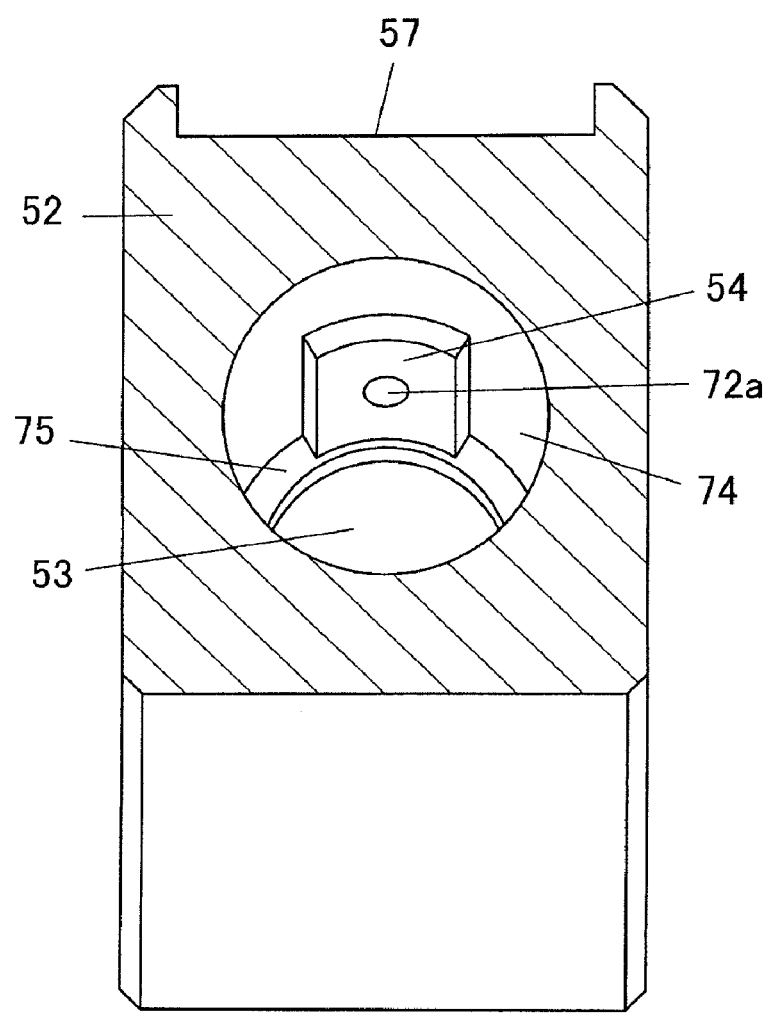
FIG. 24 is a partially broken perspective view illustrating a flow channel block that is used for the flow measuring device according to the second embodiment.
Figure 25A:
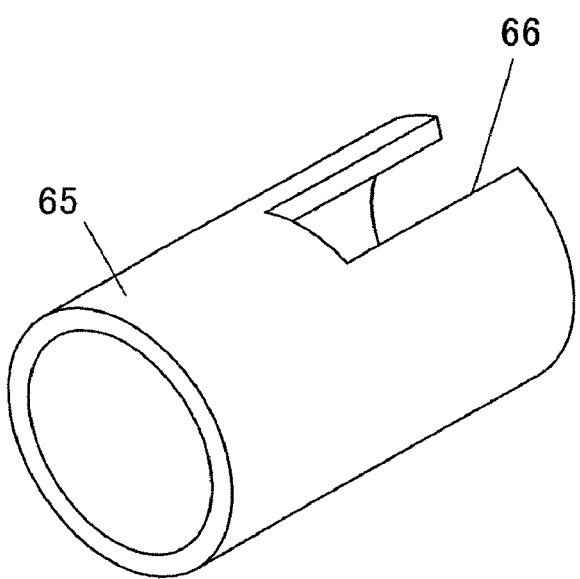
FIGS. 25A and 25B are perspective views respectively illustrating an orifice supporting spacer that is used for the flow measuring device according to the second embodiment and another orifice supporting spacer that is used for the flow measuring device according to the second embodiment.

FIG. 23 is a cross-sectional view illustrating a flow measuring device 101 according to a second embodiment of the present invention. FIG. 24 is a partially broken perspective view illustrating the flow channel block 52 that is used for the flow measuring device 101. FIG. 25A is a perspective view illustrating the orifice supporting spacer 65 that is used for the flow measuring device 101.

According to the flow measuring device 101, as shown in FIG. 25A, the cut-out section 66 is formed not along the entire orifice supporting spacer 65 such that the cut-out section 66 is shorter than the orifice supporting spacer 65. On the other hand, as shown in FIG. 24, within the main flow channel 53 of the flow channel block 52, leaving the flow channel wall 54 having the same shape and size as the cut-out section 66, the spacer container 74 is formed at the remaining area. The branch entrance 72a opens in the flow channel wall 54, and a distance sufficient for not influencing the flow ratio is maintained between the edge of the flow channel wall 54 and the branch entrance 72a. With this embodiment, it is also possible to provide the same effect as the flow measuring device 51 of the first embodiment.

Figure 25B:
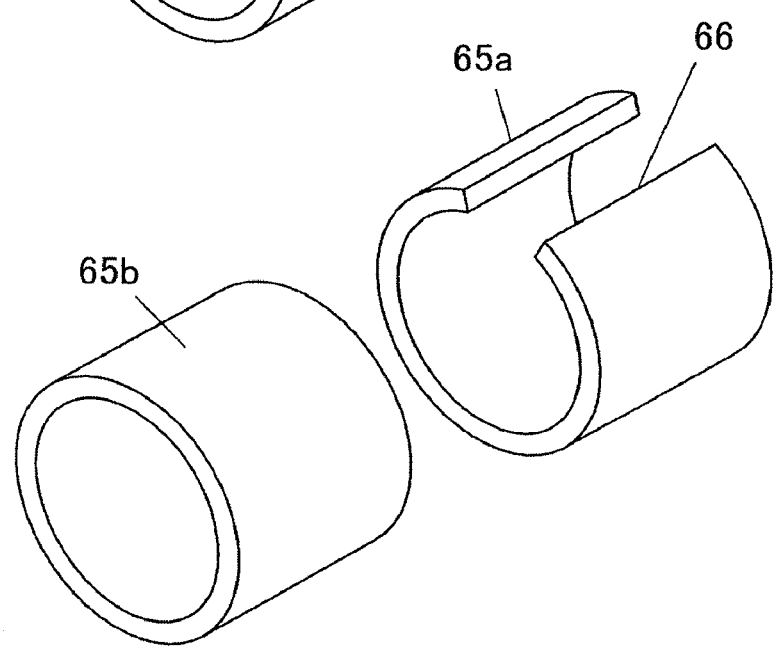

It should be noted that the orifice supporting spacer 65 that is used in this embodiment can be divided into, as shown in FIG. 25B, an orifice supporting spacer 65a having the cut-out section 66 in a slit shape and an orifice supporting spacer 65b in a cylindrical shape.

Third Embodiment

Figure 26:
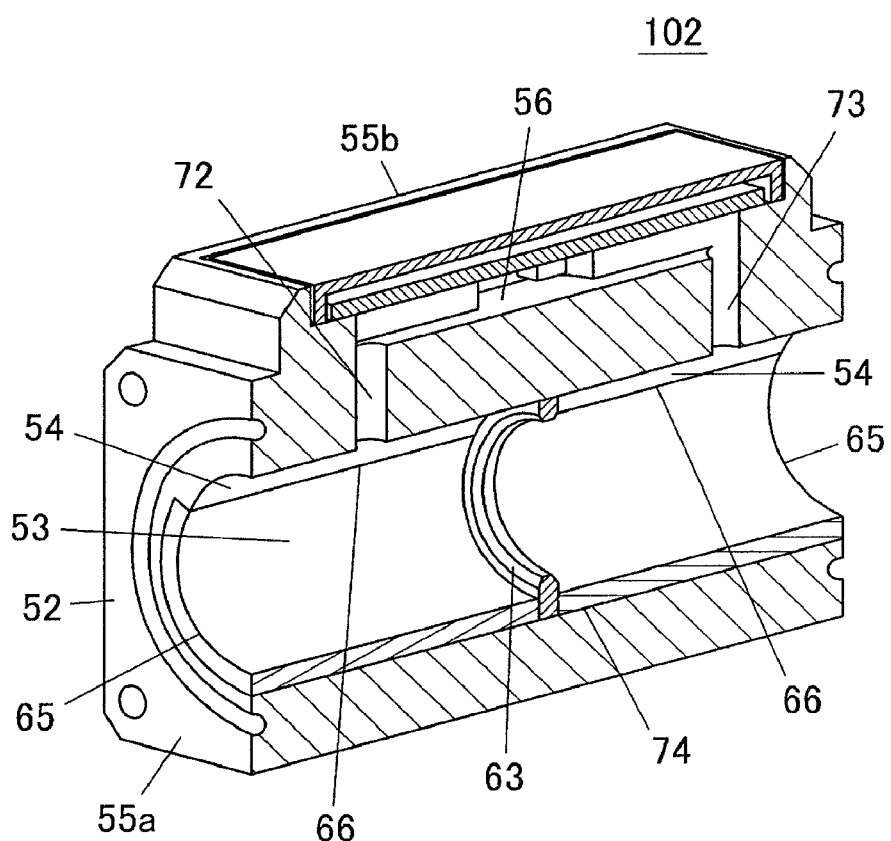
FIG. 26 is a perspective view illustrating a flow measuring device according to a third embodiment of the present invention that is cut along a center line thereof with removing an end cap.

FIG. 26 is a partially broken perspective view illustrating a flow measuring device 102 according to a third embodiment of the present invention. According to this embodiment, as described below, the back portion (a side where the collection exit 73a opens) of the main flow channel 53 has the same structure as that of the front portion (a side where the branch entrance 72a opens). According to the flow measuring device 102, the stopper section 75 is not provided within the main flow channel 53, and the flow channel wall 54 and the spacer container 74 are formed from the front end surface to a back end surface of the main flow channel portion 55a. Therefore, the main flow channel 53 before containing the orifice 63 and such has an even cross-sectional shape from the front end surface to the end surface of the main flow channel portion 55a.

One of the orifice supporting spacers 65 is inserted in the back side of the spacer container 74, the orifice 63 is inserted in the front surface, and the other orifice supporting spacer 65 is inserted in the spacer container 74 on the front side of the orifice 63. A total length of the length of the one orifice supporting spacer 65, the thickness of the orifice 63, and the length of the other orifice supporting spacer 65 is equal to the distance between the front end surface and the back end surface of the main flow channel portion 55a (or, when the resilient member 92 is inserted in the end surface of the orifice supporting spacer 65, the total length is slightly shorter than the distance between the front end surface and the back end surface of the main flow channel portion 55a), and the orifice 63 is held and positioned between the orifice supporting spacers 65 by attaching the end cap 68 to either side of the flow channel block 52.

According to the flow measuring device 102 having this structure, it is possible to change the position of the orifice 63 by changing the length of the orifice supporting spacer 65 while keeping the total length of the front and back orifice supporting spacers 65, thereby adjusting the flow ratio.

Modified Examples of Third Embodiment

Figure 27:
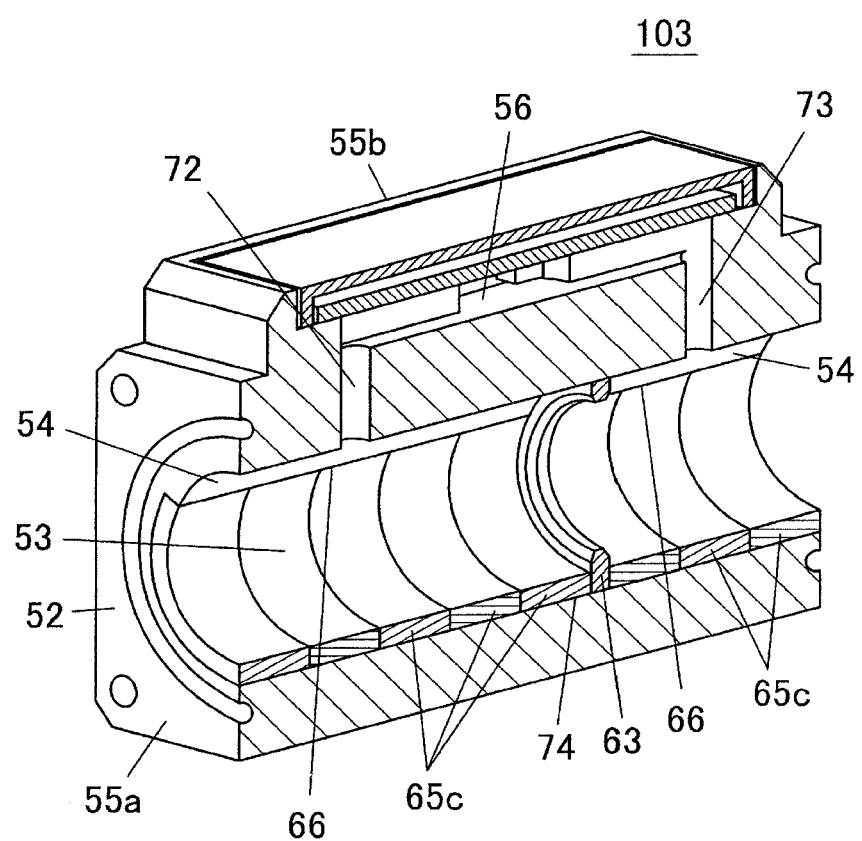
FIG. 27 is a perspective view illustrating a modified example of the flow measuring device according to the third embodiment that is cut along a center line thereof with removing an end cap.

FIG. 27 is a partially broken perspective view illustrating a modified example of the third embodiment. According to a flow measuring device 103, each of the front and back orifice supporting spacers 65 is formed by a number of short orifice supporting spacers 65c. It is desirable to use the orifice supporting spacers 65c of the same length.

According to this modified example, it is possible to freely change the position of the orifice 63 depending on a gap out of gaps between the orifice supporting spacers 65c in which the orifice 63 is inserted, thereby adjusting the flow ratio. It should be noted that such as a gas flow straightener can be sandwiched between the orifice supporting spacers 65c.

Fourth Embodiment

Figure 28:
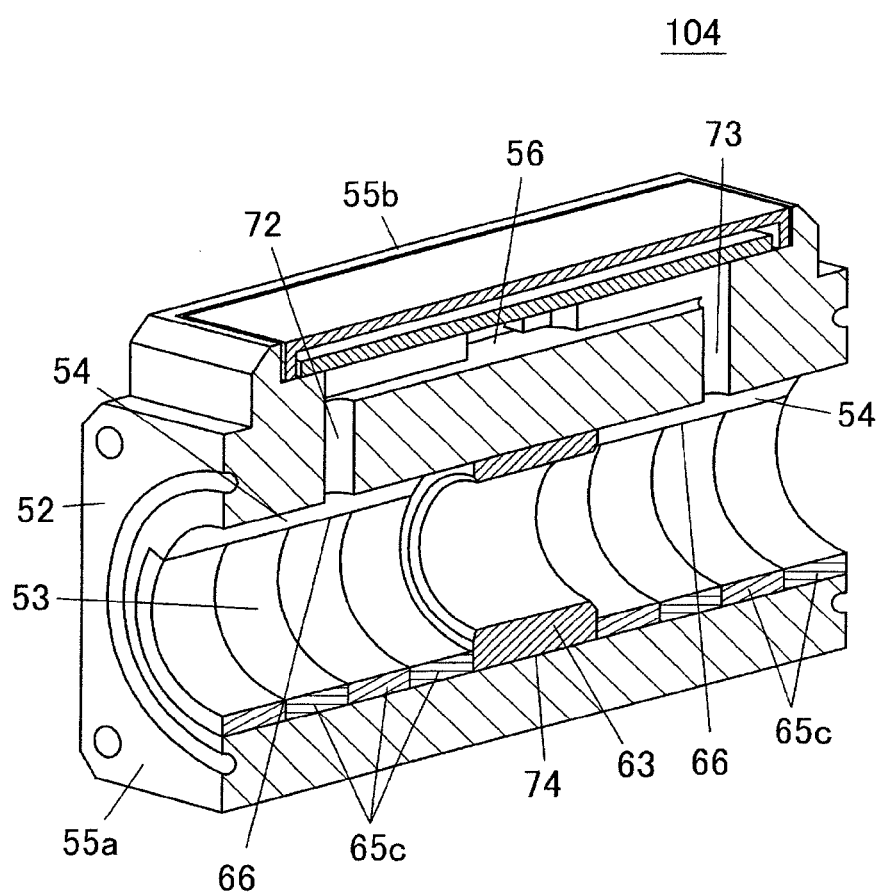
FIG. 28 is a perspective view illustrating a flow measuring device according to a fourth embodiment of the present invention that is cut along a center line thereof with removing an end cap.

FIG. 28 is a partially broken perspective view illustrating a flow measuring device 104 according to a fourth embodiment of the present invention. According to the flow measuring device 104 shown in FIG. 28, a fluid resistance is increased by increasing the length of the orifice 63. Although the opening area of the orifice 63 may be changed in order to change the fluid resistance, the fluid resistance can also be changed by changing the length of the orifice 63 as in this embodiment, thereby adjusting the flow ratio.

The length of the orifice 63 can be changed by, according to the length, changing the length of the orifice supporting spacer 65 of the structure as in the first embodiment, changing the length of the front and back orifice supporting spacers 65 of the structure as in the third embodiment, or increasing a number of the orifice supporting spacers 65c of the front or back side in the structure of the modified example according to the third embodiment.

Fifth Embodiment

Figure 29:
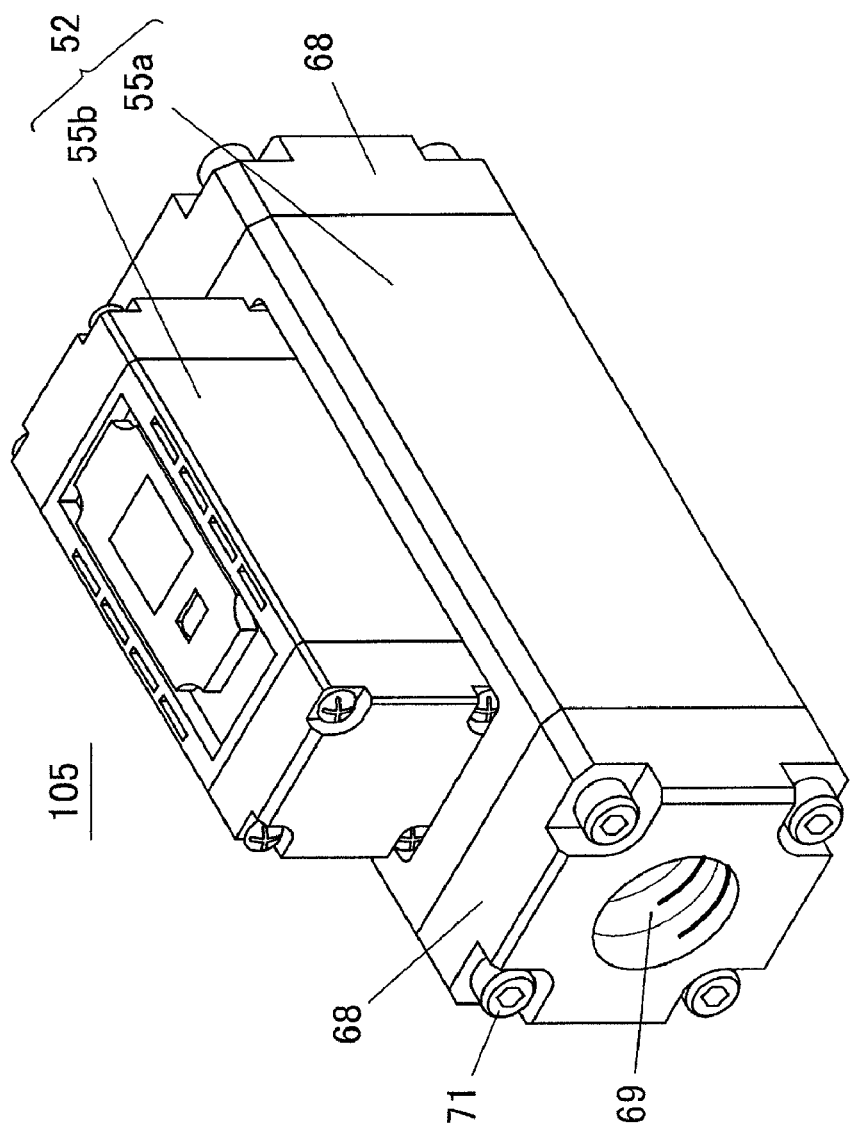
FIG. 29 is a perspective view illustrating a flow measuring device according to a fifth embodiment of the present invention.
Figure 30:
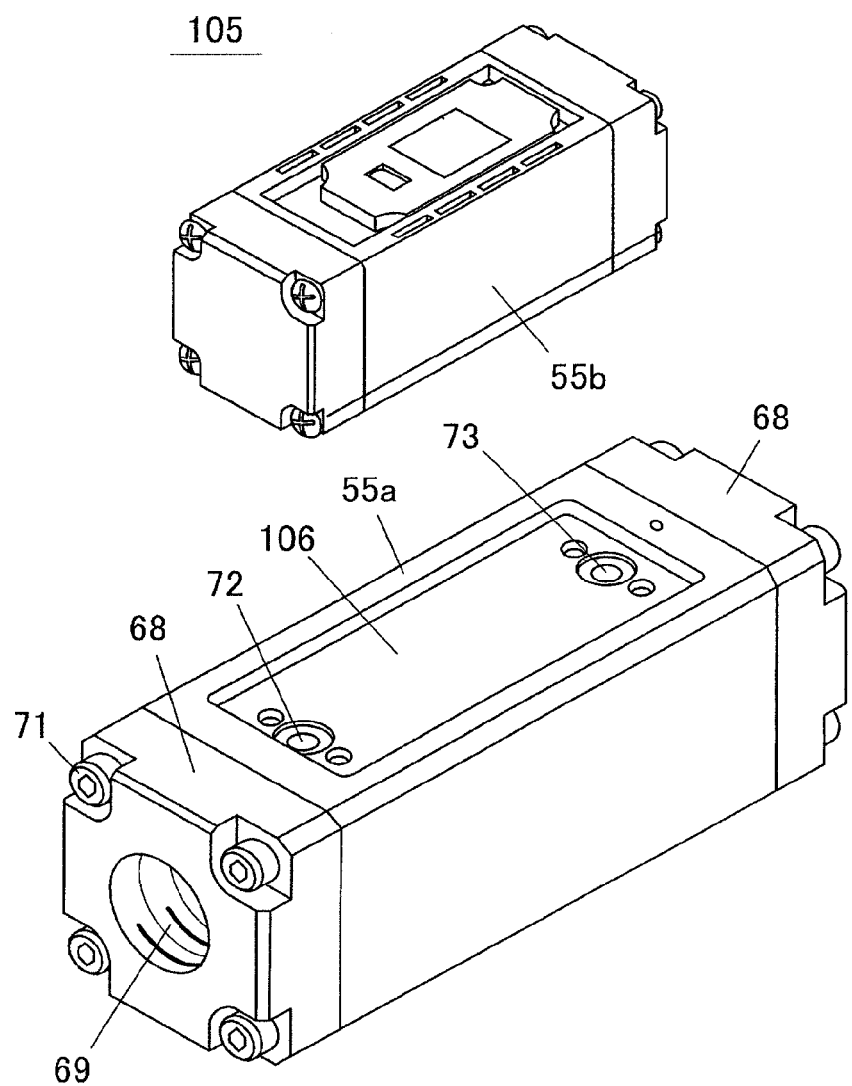
FIG. 30 is a partially exploded perspective view of a flow measuring device according to the fifth embodiment.

FIG. 29 is a perspective view of illustrating a flow measuring device 105 according to a fifth embodiment of the present invention. FIG. 30 is a partially exploded perspective view of the flow measuring device 105. According to the flow measuring device 105, the main flow channel portion 55a and the auxiliary flow channel portion 55b that configure the flow channel block 52 are separately formed. A recessed portion 106 for fitting and positioning the lower end portion of the auxiliary flow channel portion 55b is provided on the upper surface of the main flow channel portion 55a, and the upper end of the branch flow introduction channel 72 and the upper end of the branch flow collection channel 73 open within the recessed portion 106. For the auxiliary flow channel portion 55b, a flow measuring device that is available in the market or an existing one is used. The auxiliary flow channel 56 (flow channel that is available in the market or an existing one) and the flow detection element 61 are provided within the auxiliary flow channel portion 55b, and the both ends of the auxiliary flow channel 56 open in the lower surface of the auxiliary flow channel portion 55b.

When assembling the main flow channel portion 55a and the auxiliary flow channel portion 55b, an O-ring is inserted around an upper end opening of each of the branch flow introduction channel 72 and the branch flow collection channel 73, the lower end portion of the auxiliary flow channel portion 55b is fitted into the recessed portion 106 and positioned, and the lower openings of the auxiliary flow channel 56 are connected respectively to the branch flow introduction channel 72 and the branch flow collection channel 73. Then, the auxiliary flow channel portion 55b is fixed to the upper surface of the main flow channel portion 55a by a thread.

According to this embodiment, it is possible to manufacture a bypass type flow measuring device using a flow measuring device that is available in the market or an existing flow measuring device.

Other Embodiments

According to such as the first embodiment and the second embodiment, the flow channel wall 54 and the spacer container 74 are provided for the main flow channel 53 on the opening (front) side of the branch entrance 72a, and the orifice 63 that is contained in the main flow channel 53 is pressed by the orifice supporting spacer 65 inserted into the spacer container 74 from the front side. In contrast, the flow channel wall 54 and the spacer container 74 can be provided for the main flow channel 53 on the opening (back) side of the collection exit 73a, and the orifice 63 that is contained in the main flow channel 53 can be pressed by the orifice supporting spacer 65 inserted into the spacer container 74 from the back side.

Further, the connecting port 69 can be threaded.

The flow measuring device according to one or more embodiments of the present invention is for measuring the flow amount of the gaseous body, and covers a wide range of the field of application. For example, the flow measuring device according to one or more embodiments of the present invention can be used for a purpose of measuring a gas flow amount for a gas meter or a fuel cell. Alternatively, the flow measuring device according to one or more embodiments of the present invention can be used for medical devices such as therapeutic instruments for sleep apnea syndrome, industrial instruments for monitoring an air flow amount in factories (commercial airlines), or for devices built therein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A flow measuring device, comprising:
    a flow channel block including:
        a main flow channel whose both ends are open, and
        an auxiliary flow channel that branches from the main flow channel;
    a flow amount measurement element provided for the auxiliary flow channel; and
    a branch entrance and a collection exit that open in a wall surface of the main flow channel, and that communicate to the auxiliary flow channel, so that a part of a gaseous body that flows through the main flow channel is directed to the auxiliary flow channel through the branch entrance, and the gaseous body that has passed through the auxiliary flow channel is directed back to the main flow channel through the collection exit, wherein
    a holding member containing portion is provided in a depressed manner for an area excluding an area including the branch entrance and an area including the collection exit in a circumference surface of a space of the flow channel block that configures the main flow channel,
    an orifice is contained within the main flow channel,
    an orifice holding member fitted into the holding member containing portion holds the orifice by being brought into contact with the orifice, and
    the wall surface of the main flow channel is configured by a wall surface excluding the area for which the holding member containing portion is formed out of the main flow channel and an inner surface of the orifice holding member.

2. The flow measuring device according to claim 1, wherein
    a stopper section is provided in a projecting manner in the circumference surface of the space of the flow channel block that configures the main flow channel, positioning is carried out by the orifice being brought into contact with the stopper section, and the orifice is sandwiched and held between an end surface of the orifice holding member and the stopper section.

3. The flow measuring device according to claim 2, wherein
    the holding member containing portion having an even cross-sectional shape is provided in a depressed manner in the circumference surface of the space of the flow channel block that configures the main flow channel from the stopper section to one end surface of the flow channel block,
    a cut-out section is formed on the orifice holding member over an entire length direction of the orifice holding member, and
    the orifice holding member is inserted into the holding member containing portion so as to contain the wall surface other than the area where the holding member containing portion is formed out of the main flow channel in the cut-out section of the orifice holding member.

4. The flow measuring device according to claim 2, wherein
    the holding member containing portion having an even cross-sectional shape is provided in the circumference surface of the space of the flow channel block that configures the main flow channel from the stopper section to one end surface of the flow channel block,
    a cut-out section is formed on the orifice holding member at a part of the orifice holding member in a length direction, and
    the orifice holding member is inserted into the holding member containing portion so as to contain the wall surface other than the area where the holding member containing portion is formed out of the main flow channel in the cut-out section of the orifice holding member.

5. The flow measuring device according to claim 1, wherein
    a groove-shaped holding member containing portion is provided in the circumference surface of the space of the flow channel block that configures the main flow channel, a projected portion is provided on an outer circumference surface of the orifice,
    the orifice is contained within the main flow channel by fitting the projected portion into the holding member containing portion, and the orifice is held by the orifice holding member in a stick shape inserted into the holding member containing portion.

6. The flow measuring device according to claim 1, wherein the orifice within the main flow channel is held by being sandwiched by the orifice holding member fitted into the holding member containing portion from one opening of the main flow channel and another orifice holding member fitted into the holding member containing portion from the other opening of the main flow channel.

7. The flow measuring device according to claim 1, wherein the orifice holding member is configured by a plurality of orifice holding members.

8. The flow measuring device according to claim 1, wherein an end surface of the orifice holding member is pressed by an end cap attached to the end surface of the flow channel block.

9. The flow measuring device according to claim 8, wherein a resilient member is sandwiched between the end surface of the orifice holding member and the end cap.

10. The flow measuring device according to claim 1, wherein the flow channel block is configured by assembling a main flow channel portion and an auxiliary flow channel portion that are component parts separate from each other, the main flow channel is formed at the main flow channel portion, and the auxiliary flow channel is formed at the auxiliary flow channel portion.

* * * * *